(12) United States Patent
Lopatin et al.

(10) Patent No.: US 8,486,562 B2
(45) Date of Patent: Jul. 16, 2013

(54) THIN FILM ELECTROCHEMICAL ENERGY STORAGE DEVICE WITH THREE-DIMENSIONAL ANODIC STRUCTURE

(75) Inventors: Sergey D. Lopatin, Santa Clara, CA (US); Dmitri A. Brevnov, Santa Clara, CA (US); Robert Z. Bachrach, Burlingame, CA (US)

(73) Assignee: Applied Materials, Inc., Santa Clara, CA (US)

( * ) Notice: Subject to any disclaimer, the term of this patent is extended or adjusted under 35 U.S.C. 154(b) by 927 days.

(21) Appl. No.: 12/459,313

(22) Filed: Jun. 30, 2009

(65) Prior Publication Data
US 2010/0216026 A1 Aug. 26, 2010

Related U.S. Application Data

(60) Provisional application No. 61/156,862, filed on Mar. 2, 2009, provisional application No. 61/155,454, filed on Feb. 25, 2009.

(51) Int. Cl.
*H01M 4/60* (2006.01)
*H01M 4/13* (2010.01)

(52) U.S. Cl.
USPC ...... 429/215; 429/213; 429/231.8; 252/182.1

(58) Field of Classification Search
USPC .................. 429/215, 213, 231.8; 252/182.1
See application file for complete search history.

(56) References Cited

U.S. PATENT DOCUMENTS

| 7,160,531 B1 | 1/2007 | Jacques et al. |
| 2003/0036001 A1 | 2/2003 | James et al. |
| 2003/0099884 A1 | 5/2003 | Chiang et al. |
| 2003/0118884 A1 | 6/2003 | Hampden-Smith et al. |
| 2003/0129119 A1 | 7/2003 | Chiu et al. |
| 2005/0158626 A1 | 7/2005 | Wagner et al. |
| 2006/0116284 A1* | 6/2006 | Pak et al. ........................ 502/180 |
| 2007/0194467 A1 | 8/2007 | Yang et al. |
| 2007/0269699 A1* | 11/2007 | Pak et al. ......................... 429/30 |
| 2008/0279751 A1 | 11/2008 | Ma et al. |

OTHER PUBLICATIONS

Trahey, et al. "High-Capacity, Microporous Cu6Sn5-Sn Anodes for Li Ion Batteries", Journal of the Electrochemical Society, 156 (5) A385-A389 (2009).

(Continued)

*Primary Examiner* — Helen O Conley
(74) *Attorney, Agent, or Firm* — Patterson & Sheridan, LLP

(57) ABSTRACT

A method for forming a battery from via thin-film deposition processes is disclosed. A mesoporous carbon material is deposited onto a surface of a conductive substrate that has high surface area, conductive micro-structures formed thereon. A porous, dielectric separator layer is then deposited on the layer of mesoporous carbon material to form a half cell of an energy storage device. The mesoporous carbon material is made up of CVD-deposited carbon fullerene "onions" and carbon nano-tubes, and has a high porosity capable of retaining lithium ions in concentrations useful for storing significant quantities of electrical energy. Embodiments of the invention further provide for the formation of an electrode having a high surface area conductive region that is useful in a battery structure. In one configuration the electrode has a high surface area conductive region comprising a porous dendritic structure that can be formed by electroplating, physical vapor deposition, chemical vapor deposition, thermal spraying, and/or electroless plating techniques.

25 Claims, 16 Drawing Sheets
(1 of 16 Drawing Sheet(s) Filed in Color)

OTHER PUBLICATIONS

International Search Report and Written Opinion of the International Searching Authority mailed Nov. 16, 2010 in PCT/US2010/023484.
Orlanducci, S., et al.; Nanocrystalline non-planar carbons: Growth of carbon nanotubes and curled nanostructures; Cryst. Res. Technol., Sep. 15, 2005, vol. 40(10-11), pp. 928-931.

Ryu, H., et al.; Synthesis and Optimization of MWCNTs on Co-Ni/MgO by Thermal CVD; Advances in Condensed Matter Physics, 2008, pp. 1-6.
International Search Report. PCT/US2010/023640 dated Nov. 30, 2010.

* cited by examiner

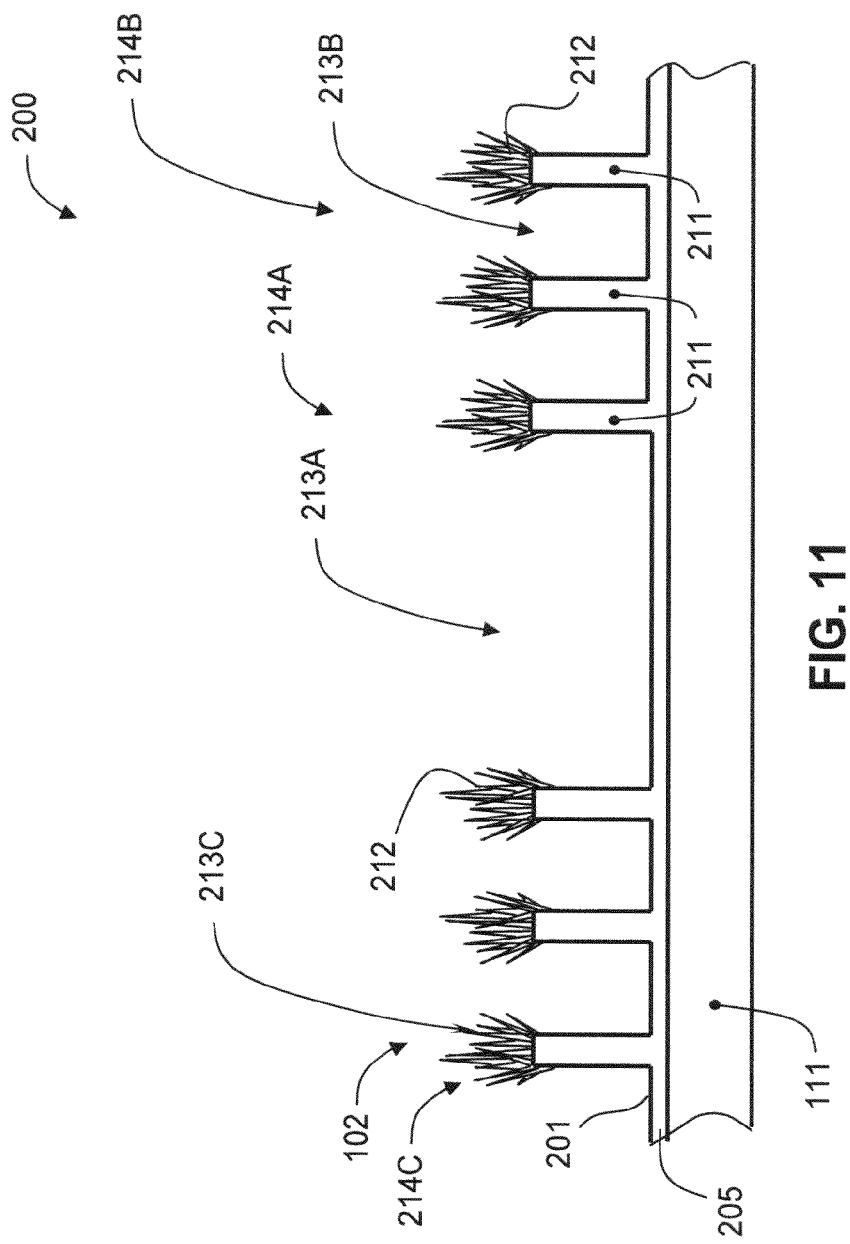

THIN FILM ELECTROCHEMICAL ENERGY STORAGE DEVICE WITH THREE-DIMENSIONAL ANODIC STRUCTURE

CROSS-REFERENCE TO RELATED APPLICATIONS

This application claims the benefit of U.S. Provisional Patent Application Ser. No. 61/156,862, filed Mar. 2, 2009 and U.S. Provisional Patent Application Ser. No. 61/155,454, filed Feb. 25, 2009, which are both herein incorporated by reference.

BACKGROUND OF THE INVENTION

1. Field of the Invention

Embodiments of the present invention relate generally to lithium-ion batteries, and more specifically, to a method of fabricating such batteries using thin-film deposition processes that form three-dimensional structures.

2. Description of the Related Art

Fast-charging, high-capacity energy storage devices, such as supercapacitors and lithium—(Li) ion batteries, are used in a growing number of applications, including portable electronics, medical, transportation, grid-connected large energy storage, renewable energy storage, and uninterruptible power supply (UPS). In modern rechargeable energy storage devices, the current collector is made of an electric conductor. Examples of materials for the positive current collector (the cathode) include aluminum, stainless steel, and nickel. Examples of materials for the negative current collector (the anode) include copper (Cu), stainless steel, and nickel (Ni). Such collectors can be in the form of a foil, a film, or a thin plate, having a thickness that generally ranges from about 6 to 50 μm.

The active electrode material in the positive electrode of a Li-ion battery is typically selected from lithium transition metal oxides, such as $LiMn_2O_4$, $LiCoO_2$, and combinations of Ni or Li oxides and includes electroconductive particles, such as carbon or graphite, and binder material. Such positive electrode material is considered to be a lithium-intercalation compound, in which the quantity of conductive material is in the range from 0.1% to 15% by weight.

Graphite is usually used as the active electrode material of the negative electrode and can be in the form of a lithium-intercalation meso-carbon micro beads (MCMB) powder made up of MCMBs having a diameter of approximately 10 μm. The lithium-intercalation MCMB powder is dispersed in a polymeric binder matrix. The polymers for the binder matrix are made of thermoplastic polymers including polymers with rubber elasticity. The polymeric binder serves to bind together the MCMB material powders to preclude crack formation and prevent disintegration of the MCMB powder on the surface of the current collector. The quantity of polymeric binder is in the range of 2% to 30% by weight.

The separator of Li-ion batteries is typically made from microporous polyethylene and polyolefine, and is applied in a separate manufacturing step.

For most energy storage applications, the charge time and capacity of energy storage devices are important parameters. In addition, the size, weight, and/or expense of such energy storage devices can be significant limitations. The use of electroconductive particles and MCMB powders and their associated binder materials in energy storage devices has a number of drawbacks. Namely, such materials limit the minimum size of the electrodes constructed from such materials, produce unfavorable internal resistance in an energy storage device, and require complex and eclectic manufacturing methods.

Accordingly, there is a need in the art for faster charging, higher capacity energy storage devices that are smaller, lighter, and can be more cost effectively manufactured.

SUMMARY OF THE INVENTION

Embodiments of the invention contemplate forming an electrochemical device, such as a battery or supercapacitor, using thin-film deposition processes and other methods of forming the same.

According to one embodiment, an anodic structure used to form an electrochemical device, comprises a substrate having a surface that is conductive, a plurality of conductive microstructures formed on the surface of the substrate, wherein the plurality of conductive microstructures comprise columnar projections formed by an electroplating process, a mesoporous carbon layer formed over the conductive microstructures, and an insulative separator layer formed on the mesoporous carbon layer.

According to another embodiment, a method of forming an anodic structure comprises forming conductive microstructures on a conductive surface of a substrate, depositing a mesoporous carbon layer on the formed conductive microstructures, and depositing a fluid-permeable and electrically insulative separator layer on the mesoporous carbon layer.

According to another embodiment, a method of fabricating a battery cell comprises forming conductive microstructures on a conductive surface of a substrate, depositing a mesoporous carbon layer on the conductive microstructures, depositing a fluid-permeable, electrically insulative separator layer on the mesoporous carbon layer, depositing an active cathodic material on the electrically insulative separator layer, depositing a current collector on the active cathodic material using a thin-film metal deposition process, and depositing a dielectric layer on the current collector.

According to another embodiment, a method of fabricating a battery cell comprises forming an anodic structure by a first thin-film deposition process, the first thin-film deposition process comprising forming conductive microstructures on a conductive surface of a first substrate; depositing a mesoporous carbon layer on the conductive microstructures, depositing a fluid-permeable, electrically insulative separator layer on the mesoporous carbon layer; and depositing an active cathodic material on the electrically insulative separator layer, forming a cathodic structure by a second thin-film deposition process, the second thin-film deposition process comprising forming conductive microstructures on a conductive surface of a second substrate and depositing an active cathodic material on the conductive microstructures, and joining the anodic structure and the cathodic structure.

According to another embodiment, a mesoporous intercalation layer comprises a first carbon fullerene onion having a first diameter of between about 5 nm and about 50 nm, a first carbon nano-tube connected to the first carbon fullerene onion and having a first length of between about 5 nm and about 50 nm, a second carbon fullerene onion connected to the first carbon nano-tube and having a second diameter of between about 5 nm and about 50 nm, and a second carbon nano-tube connected to the second carbon fullerene onion and having a second length of between about 5 nm and about 50 nm and a third fullerene onion connected to the second nano-tube.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The patent or application file contains at least one drawing executed in color. Copies of this patent or patent application publication with color drawings(s) will be provided by the Office upon request and payment of the necessary fee.

FIG. 11 is schematic cross-sectional views of an anodic structure according to one embodiment of the invention.

Figure 1:
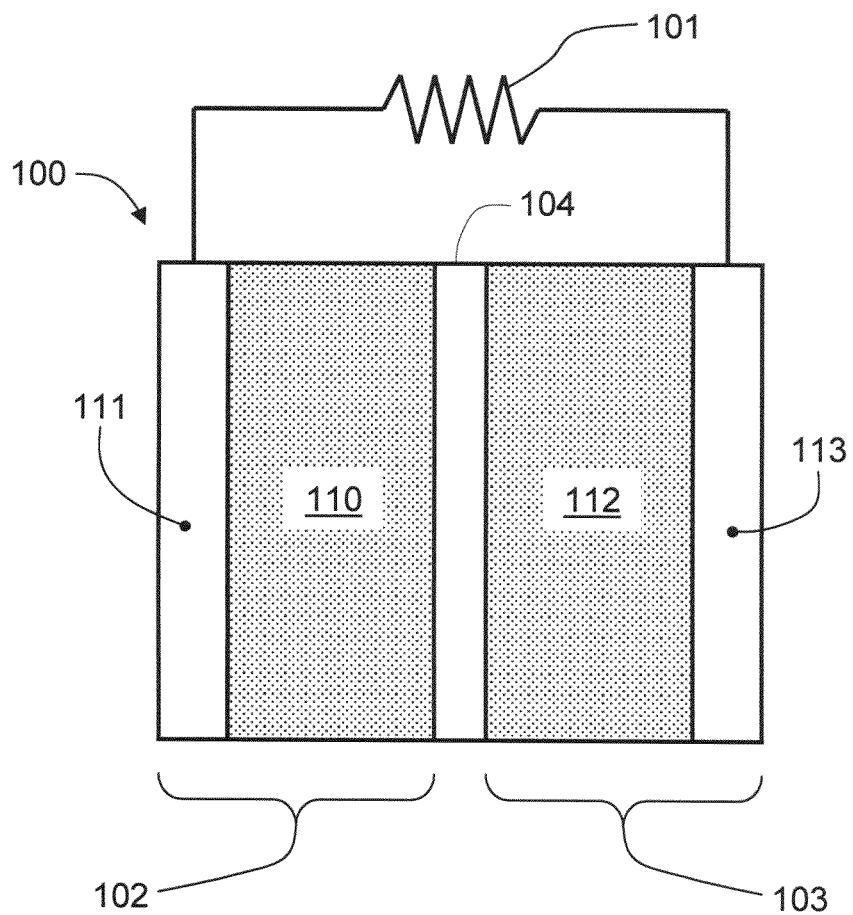
FIG. 1 is a schematic diagram of a Li-ion battery electrically connected to a load, according to an embodiment of the invention.

To facilitate understanding, identical reference numerals have been used, wherever possible, to designate identical elements that are common to the figures. It is contemplated that elements and/or process steps of one embodiment may be beneficially incorporated in other embodiments without additional recitation.

DETAILED DESCRIPTION

Embodiments of the invention contemplate forming an electrochemical device, such as a battery or supercapacitor, using thin-film deposition processes and other methods of forming the same. The embodiments described herein include the deposition of a mesoporous carbon material onto a surface of a conductive substrate that has high surface area to form conductive micro-structures thereon. A mesoporous material, as defined herein, is a material containing pores with diameters between about 2 nanometers (nm) and about 50 nm. A porous, dielectric separator layer is then deposited on the layer of mesoporous carbon material to form a half cell of an energy storage device, such as an anodic structure for a Li-ion battery, or half of a super capacitor. The mesoporous carbon material is made up of CVD-deposited carbon fullerene "onions" and/or carbon nano-tubes (CNTs), both of which are capable of retaining lithium ions in concentrations useful for storing significant quantities of electrical energy. The separator layer may be a densified layer of the mesoporous carbon layer or, alternatively, a polymer-based layer known in the art. In one embodiment, the second half cell of a battery or half of a super capacitor is formed separately and subsequently joined to the separator layer. In another embodiment, the second half cell of a battery or half of a super capacitor is formed by depositing additional thin films onto the separator layer.

FIG. 1 is a schematic diagram of a Li-ion battery 100 electrically connected to a load 101, according to an embodiment of the invention. The primary functional components of Li-ion battery 100 include an anode structure 102, a cathode structure 103, a separator layer 104, and an electrolyte (not shown) disposed within the region between the opposing current collectors 111 and 113. A variety of materials may be used as the electrolyte, such as a lithium salt in an organic solvent. The electrolyte is contained in anode structure 102, cathode structure 103, and a fluid-permeable separator layer 104 in the region formed between the current collectors 111 and 113.

Anode structure 102 and cathode structure 103 each serve as a half-cell of Li-ion battery 100, and together form a complete working cell of Li-ion battery 100. Anode structure 102 includes a current collector 111 and a mesoporous carbon material 110 that acts as a carbon-based intercalation host material for retaining lithium ions. Similarly, cathode structure 103 includes a current collector 113 and an intercalation host material 112 for retaining lithium ions, such as a metal oxide. Separator layer 104 is a dielectric, porous, fluid-permeable layer that prevents direct electrical contact between the components in the anode structure 102 and the cathode structure 103. Methods of forming Li-ion battery 100, as well as the materials that make up the constituent parts of Li-ion battery 100, i.e., anode structure 102, cathode structure 103, and separator layer 104, are described below in conjunction with FIGS. 2A-D.

Rather than the traditional redox galvanic action of a conventional secondary cell, Li-ion secondary cell chemistry depends on a fully reversible intercalation mechanism, in which lithium ions are inserted into the crystalline lattice of an intercalation host material in each electrode without changing the crystal structure of the intercalation host material. Thus, it is necessary for such intercalation host materials in the electrodes of a Li-ion battery to have open crystal structures that allow the insertion or extraction of lithium ions and have the ability to accept compensating electrons at the same time. In Li-ion battery 100, the anode, or negative electrode, is based on carbon, i.e., mesoporous carbon material 110. The cathode, or positive electrode, is made from a metal oxide, such as lithium cobalt dioxide ($LiCoO_2$) or lithium manganese dioxide ($LiMnO_2$). The cathode 152 may be made from a layered oxide, such as lithium cobalt oxide, a polyanion, such as lithium iron phosphate, a spinel, such as lithium manganese oxide, or $TiS_2$ (titanium disulfide). Exemplary oxides may be layered lithium cobalt oxide, or mixed metal oxide, such as $LiNi_xCo_{1-2x} MnO_2$, $LiMn_2O_4$ Exemplary phosphates may be iron olivine ($LiFePO_4$) and it is variants (such as $LiFe1-_xMgPO_4$), $LiMoPO_4$, $LiCoPO_4$, $Li_3V_2(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, or $Na_5V_2(PO_4)_2F_3$ Exemplary silicates may be $Li_2FeSiSiO_4$, $Li_2MnSiO_4$, or $Li_2VOSiO_4$.

Separator layer 104 is configured to supply ion channels for movement between anode structure 102 from cathode structure 103 while keeping anode structure 102 from cathode structure 103 physically separated to avoid a short. In one embodiment, separator layer 104 may be formed as an upper layer of mesoporous carbon material 110. Alternatively, separator layer 104 deposited onto the surface of mesoporous carbon material 110 and may be a solid polymer, such as polyolefin, polypropylene, polyethylene, and combinations thereof.

In operation, Li-ion battery 100 provides electrical energy, i.e., energy is discharged, when anode structure 102 and cathode structure 103 are electrically coupled to load 101, as shown in FIG. 1. Electrons originating from mesoporous carbon material 110 flow from current collector 111 of anode structure 102 through load 101 and current collector 113 to intercalation host material 112 of cathode structure 103. Concurrently, lithium ions are dissociated, or extracted, from mesoporous carbon material 110 of anode structure 102, and move through separator layer 104 into intercalation host material 112 of cathode structure 103 and are inserted into the crystal structure of intercalation host material 112. The electrolyte, which resides in mesoporous carbon material 110, intercalation host material 112, and separator layer 104, allows the movement of lithium ions from mesoporous carbon material 110 to intercalation host material 112 via ionic conduction. Li-ion battery 100 is charged by electrically coupling an electromotive force of an appropriate polarity to anode structure 102 and cathode structure 103 in lieu of the load 101. Electrons then flow from current collector 113 of cathode structure 103 to current collector 111 of anode structure 102, and lithium ions move from intercalation host material 112 in cathode structure 103, through separator layer 104, and into mesoporous carbon material 110 of anode structure 102. Thus, lithium ions are intercalated into cathode structure 103 when Li-ion battery 100 is discharged, and into anode structure 102 when Li-ion battery 100 is in the charged state.

Figure 2A:
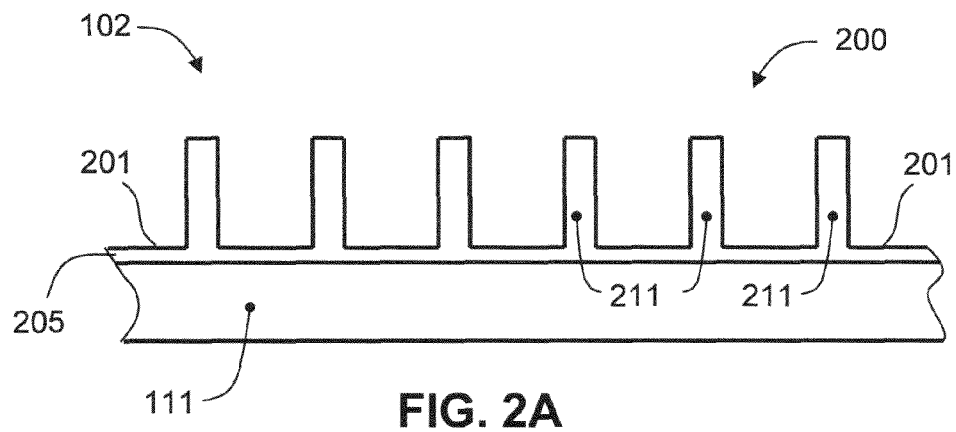
FIGS. 2A-2D are schematic cross-sectional views of an anodic structure at various stages of formation, according to embodiments of the invention.

FIGS. 2A-2D are schematic cross-sectional views of anodic structure 102 at various stages of formation, according to embodiments of the invention. In FIG. 2A, current collector 111 is schematically illustrated prior to the formation of mesoporous carbon material 110. Current collector 111 may include a relatively thin conductive layer disposed on a host substrate, or simply a conductive substrate (e.g., foil, sheet, and plate), comprising one or more conductive materials, such as a metal, plastic, graphite, polymers, carbon-containing polymer, composite, or other suitable materials. Examples of metals that current collector 111 may be comprised of include copper (Cu), zinc (Zn), nickel (Ni), cobalt (Co), palladium (Pd), platinum (Pt), tin (Sn), ruthenium (Ru), stainless steel, alloys thereof, and combinations thereof. In one embodiment, current collector 111 is a metallic foil and may have an insulating coating disposed thereon. Alternatively, current collector 111 may comprise a host substrate that is non-conductive, such as a glass, silicon, and plastic or polymeric substrate that has an electrically conductive layer formed thereon by means known in the art, including physical vapor deposition (PVD), electrochemical plating, electroless plating, and the like. In one embodiment, current collector 111 is formed out of a flexible host substrate. The flexible host substrate may be a lightweight and inexpensive plastic material, such as polyethylene, polypropylene or other suitable plastic or polymeric material, with a conductive layer formed thereon. Materials suitable for use as such a flexible substrate include a polyimide (e.g., KAPTON™ by DuPont Corporation), polyethyleneterephthalate (PET), polyacrylates, polycarbonate, silicone, epoxy resins, silicone-functionalized epoxy resins, polyester (e.g., MYLAR™ by E.I. du Pont de Nemours & Co.), APICAL AV manufactured by Kanegaftigi Chemical Industry Company, UPILEX manufactured by UBE Industries, Ltd.; polyethersulfones (PES) manufactured by Sumitomo, a polyetherimide (e.g., ULTEM by General Electric Company), and polyethylenenaphthalene (PEN). Alternately, the flexible substrate may be constructed from a relatively thin glass that is reinforced with a polymeric coating.

As shown, current collector 111 has conductive microstructures 200 formed on a surface 201 thereof. Conductive microstructures 200 greatly increase the effective surface area of current collector 111 and reduce the distance that charge must travel in the intercalation layer of anode structure 102 before entering current collector 111. Thus, the formation of conductive microstructures 200 on surface 201 reduces the charge/discharge time and internal resistance of an energy storage device that is configured with anode structure 102. In FIG. 2A, conductive microstructures 200 are depicted schematically as rectangular projections, oriented perpendicular to surface 201. Different configurations of conductive microstructures 200 are contemplated by embodiments of the invention, and are described below in conjunction with FIGS. 2A and 2B.

In one embodiment, conductive microstructures 200 on current collector 111 are formed as a three dimensional, columnar growth of material by use of a high plating rate electroplating process performed at current densities above the limiting current ($i_L$). In this way, columnar projections 211 in the conductive microstructures 200 may be formed on surface 201. The diffusion-limited electrochemical plating process by which conductive microstructures 200 are formed is described below in step 602 of FIG. 6, in which the electroplating limiting current is met or exceeded, thereby producing a low-density metallic dendritic/columnar structure on surface 201 rather than a conventional high-density conformal film. In another embodiment, the substrate may be roughened by chemically treating the surface of the substrate to increase the surface area, and/or patterned and etched using methods known in the art for patterning metallic films. In one embodiment, current collector 111 is a copper-containing foil or a substrate having a layer of copper-containing metal deposited thereon, and therefore has a copper or copper alloy surface. In such an embodiment, a copper electro-plating process may be used to form columnar projections 211. It is believed that electroplating has advantages over other material deposition techniques, or other forming techniques, that might be used to form the conductive microstructures 200, such as PVD, CVD, thermal spraying, and electroless plating techniques, due to the high deposition rate and/or ability to adjust the surface area of the deposited film by adjusting the electroplating process parameters (e.g., plating current, fluid flow, bath chemicals). Columnar projections 211 may also be formed by performing electroplating processes on other surfaces besides the copper-containing surfaces. For example, surface 201 may include a surface layer of any other metal that may act as a catalytic surface for the subsequent formation of a mesoporous carbon material, such as silver (Ag), iron (Fe), nickel (Ni), cobalt (Co), palladium (Pd), and platinum (Pt), among others.

To aid in the electrochemical deposition of columnar projections 211, current collector 111 may include a conductive seed layer 205 that has been deposited thereon. Conductive seed layer 205 preferably comprises a copper seed layer or alloys thereof. Other metals, particularly noble metals, may also be used for conductive seed layer 205. Conductive seed layer 205 may be deposited on current collector 111 by techniques well known in the art, including physical vapor deposition (PVD), chemical vapor deposition (CVD), thermal evaporation, and electroless deposition techniques, among others. Alternatively, columnar projections 211 may be formed by an electrochemical plating process directly on current collector 111, i.e., without conductive seed layer 205.

Figure 2B:
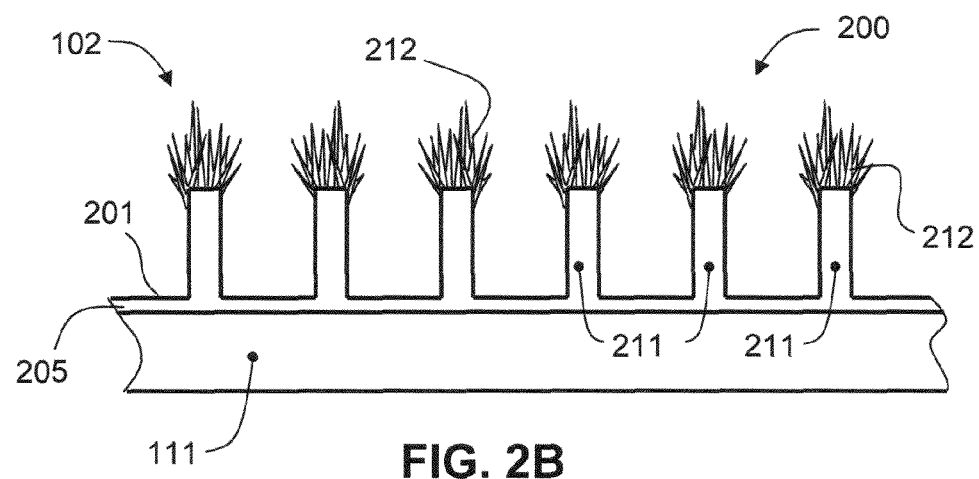

FIG. 2B schematically illustrates conductive microstructures 200 including dendritic structures 212 formed columnar projections 211, according to an embodiment of the invention. Dendritic structures 212 are high-surface-area, dendritic structure comprised of a plated metal or metal alloy. In one embodiment, dendritic structures 212 are formed by an electrochemical plating process described below in step 603 of FIG. 6, in which the over potential, or applied voltage used to form the dendritic structures 212 is significantly greater than that used to form the columnar projections 211, thereby producing a three-dimensional, low-density metallic dendritic structure on columnar projections 211. In another embodiment, dendritic structures 212 are formed by an electroless plating process. In such an embodiment, dendritic structures 212 are comprised of chains of catalytic metal nano-particles. Similar to the dendritic structures formed by electrochemical plating, such chains of catalytic metal nano-particles form a low-density metallic structure on the columnar projections 211, which, on a nano-scale, greatly increases the conductive surface area of current collector 111. An exemplary electroless deposition process in which silver nano-particles form chains of catalytic metal nano-particles on columnar projections 211 is described below in step 603 of FIG. 6. Dendritic structures 212 have been demonstrated to increase the conductive surface area of current collector 111 significantly more than columnar projections 211 alone. In one embodiment, the dendritic structures 212 may increase the conductive surface area of current collector 111 by a factor of 10 to 100. Dendritic structures 212 also provide a catalytic surface on which a mesoporous carbon material may subsequently be formed, according to embodiments of the invention.

Figure 2C:
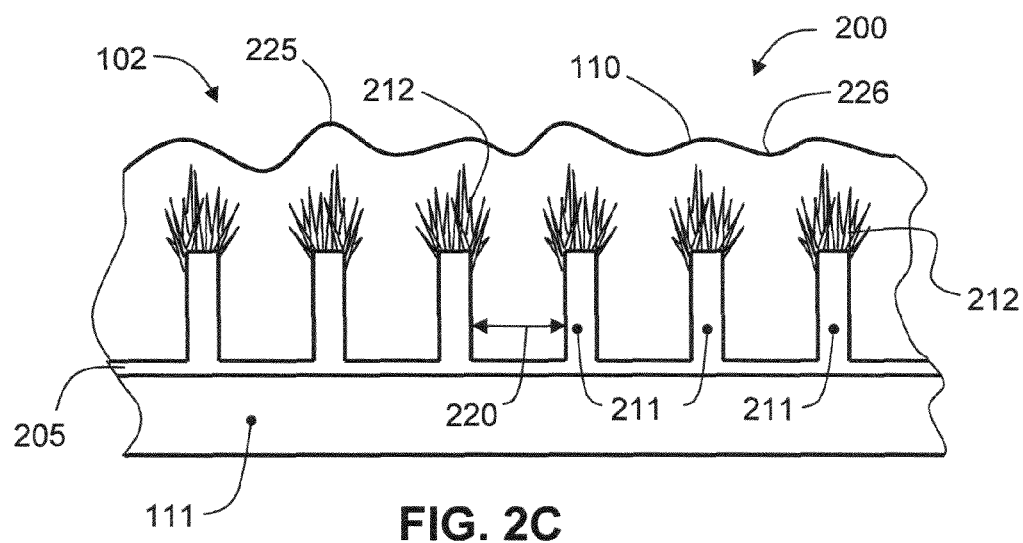

FIG. 2C illustrates current collector 111 after the formation of mesoporous carbon material 110 on conductive microstructures 200, according to an embodiment of the invention. Conductive microstructures 200 may include columnar projections 211 and/or dendritic structures 212, as described above. Mesoporous carbon material 110 is comprised of CVD-deposited carbon fullerene onions connected by carbon nano-tubes (CNTs) in a three-dimensional, high-surface-area lattice that are deposited over the conductive microstructures 200. Carbon fullerenes are a family of carbon molecules that are composed entirely of carbon atoms and are in the form of a hollow sphere, ellipsoid, tube, or plane. The carbon fullerene onion is made up of multiple nested carbon layers, where each carbon layer is a spherical carbon fullerene, or "buckyball," of increasing diameter. CNTs, also referred to as "buckytubes," are cylindrical fullerenes, and are usually only a few nanometers in diameter and of various lengths. CNTs are also known in the art when formed as separate structures and not connected to fullerene onions. The unique molecular structure of CNTs results in extraordinary macroscopic properties, including high tensile strength, high electrical conductivity, high ductility, high resistance to heat, and relative chemical inactivity, many of which are useful for components of energy storage devices.

It is believed that a useful diameter of a spherical carbon fullerene onion and length of the carbon nanotubes in a mesoporous carbon material 110 can range between about 5 nm and 50 nm to produce pore sizes that range in size between about 5 nm and 5 microns. In one embodiment, the nominal pore size of mesoporous carbon material 110 ranges between about 5 nm and about 50 nm. In another embodiment, the nominal pore size of mesoporous carbon material 110 ranges between about 50 nm and about 1 micron. In yet another embodiment, the nominal pore size of mesoporous carbon material 110 ranges between about 1 micron and about 5 microns. When mesoporous carbon material 110 is used as an intercalation material in an energy storage device, such as at the anode of a Li-ion battery, the internal volumes of spherical carbon fullerene onions and carbon nanotubes serve as sites at which lithium ions may reside. As noted above, intercalation is the reversible inclusion of an ion between the molecules, groups, or atoms of an intercalation host material. The "sponge-like" nature of mesoporous carbon material 110 on the nano-scale produces a very high internal surface area therein, thereby allowing mesoporous carbon material 110 to retain a relatively high concentration of lithium ions when filled with an appropriate electrolyte, e.g., a lithium salt in an organic solvent. In addition, the macroporosity of mesoporous carbon material 110, i.e., the empty volume between the three-dimensional lattice of interconnected carbon fullerenes, retains the liquid portion of the electrolyte. In light of the above properties of mesoporous carbon material 110, energy storage devices that use mesoporous carbon material 110 as an intercalation layer may be smaller and/or have increased energy storage capacity due to the high concentration of lithium ions that can be stored in the intercalation layer.

Figure 4A:
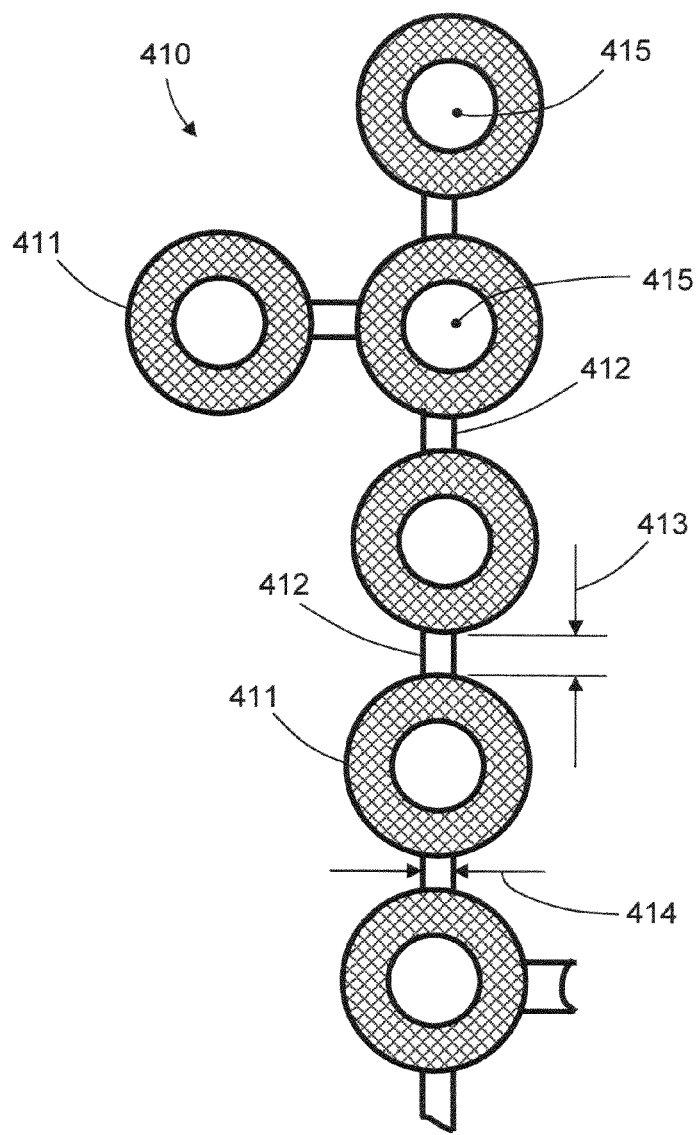
FIGS. 4A-4E are schematic illustrations of different configurations of hybrid fullerene chains that may make up the three-dimensional lattice of interconnected carbon fullerenes of a mesoporous carbon material, according to embodiments of the invention.

FIGS. 4A-E are schematic illustrations of different configurations of hybrid fullerene chains 410, 420, 430, 440, and 450 that may make up the three-dimensional lattice of interconnected carbon fullerenes of mesoporous carbon material 110, according to embodiments of the invention. FIGS. 4A-E are based on images of mesoporous carbon material 110 obtained by the inventors using scanning electron microscopy (SEM) and transmission electron microscopy (TEM). The solid lines in FIGS. 4A-E represent atomic surfaces of carbon made up of the linked hexagonal and pentagonal rings of carbon atoms characteristic of fullerene material. Solid lines joined by a shaded region represent multiple-layered fullerene structures seen in cross-section. FIG. 4A schematically depicts a hybrid fullerene chain 410, which is a high-aspect ratio configuration of a plurality of spherical carbon fullerene onions 411 connected by multi-walled or single-walled carbon nanotubes 412. While depicted in FIGS. 4A-E as circular in cross-section, it is known in the art that spherical carbon fullerene onions 411 may not be perfectly spherical. Spherical carbon fullerene onions 411 may also be oblate, oblong, elliptical in cross-section, etc. In addition, the inventors have observed via TEM and SEM that spherical carbon fullerene onions 411 in mesoporous carbon material 110 may be asymmetrical and/or aspherical, as shown below in FIGS. 5A and 5B. Carbon nanotubes 412 may be about 1-10 nm in diameter, and may be either multi-walled or single-walled nanotubes. In one configuration, as shown in the side cross-sectional view, carbon nanotubes 412 form relatively low-aspect ratio connections between spherical carbon fullerene onions 411, where the length 413 of each carbon nanotube 412 is approximately equal to the diameter 414 thereof. Spherical carbon fullerene onions 411 may each include a $C_{60}$ molecule or other nano-particle forming the core 415 of each spherical carbon fullerene onion 411 and multiple layers of graphene planes, which are indicated by the shaded regions. Examples of nano-particles besides $C_{60}$ molecules that may form the core 415 of a spherical carbon fullerene onion 411 include iron, nickel, cobalt, and their oxides.

Figure 4B:
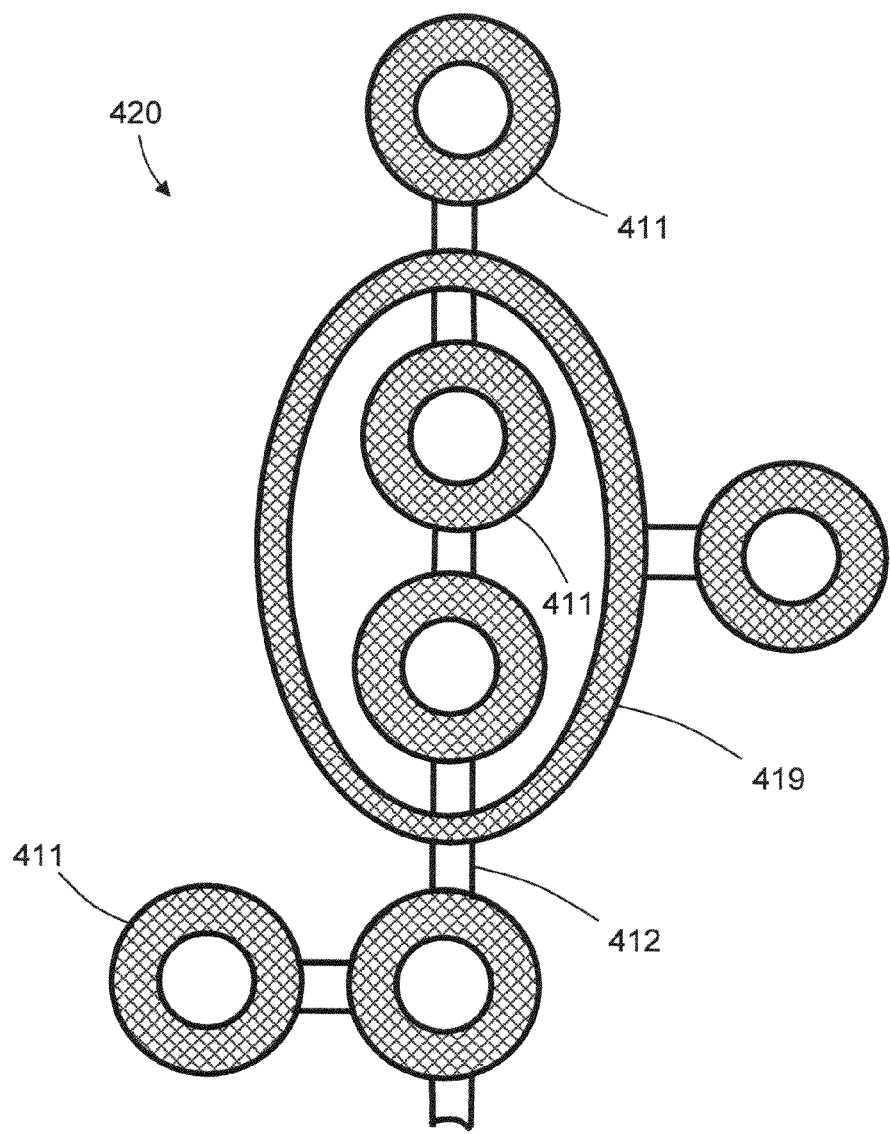
Figure 4C:
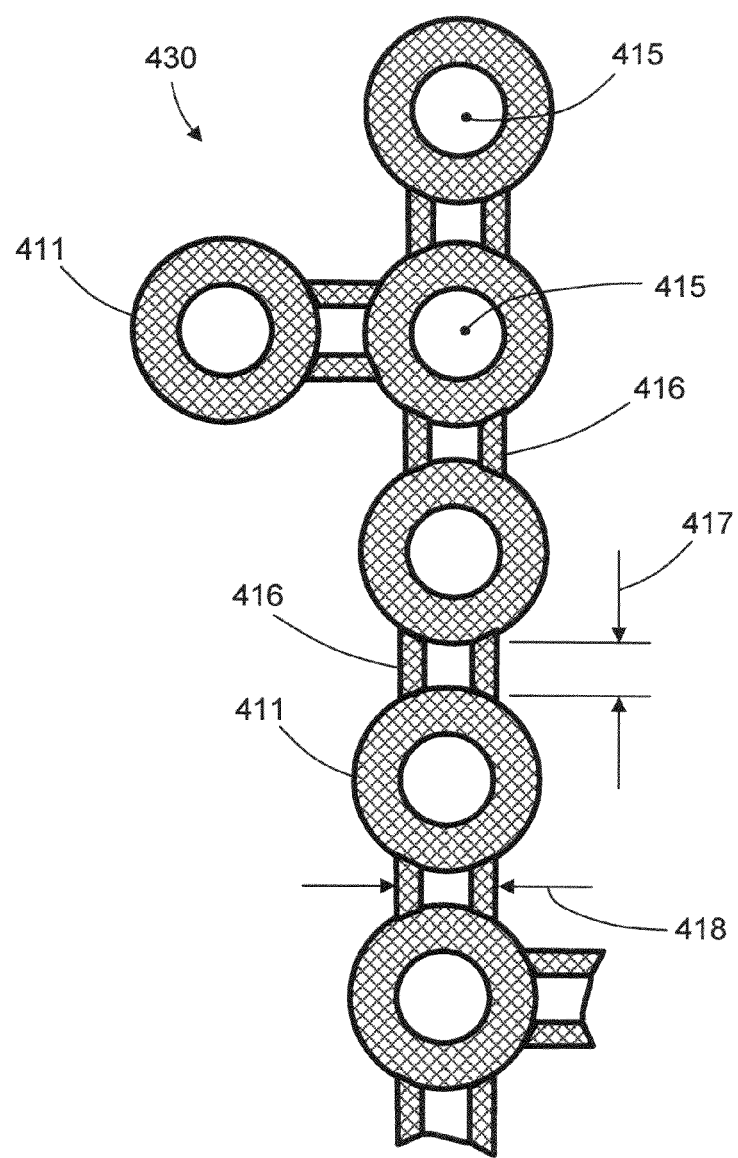
Figure 4D:
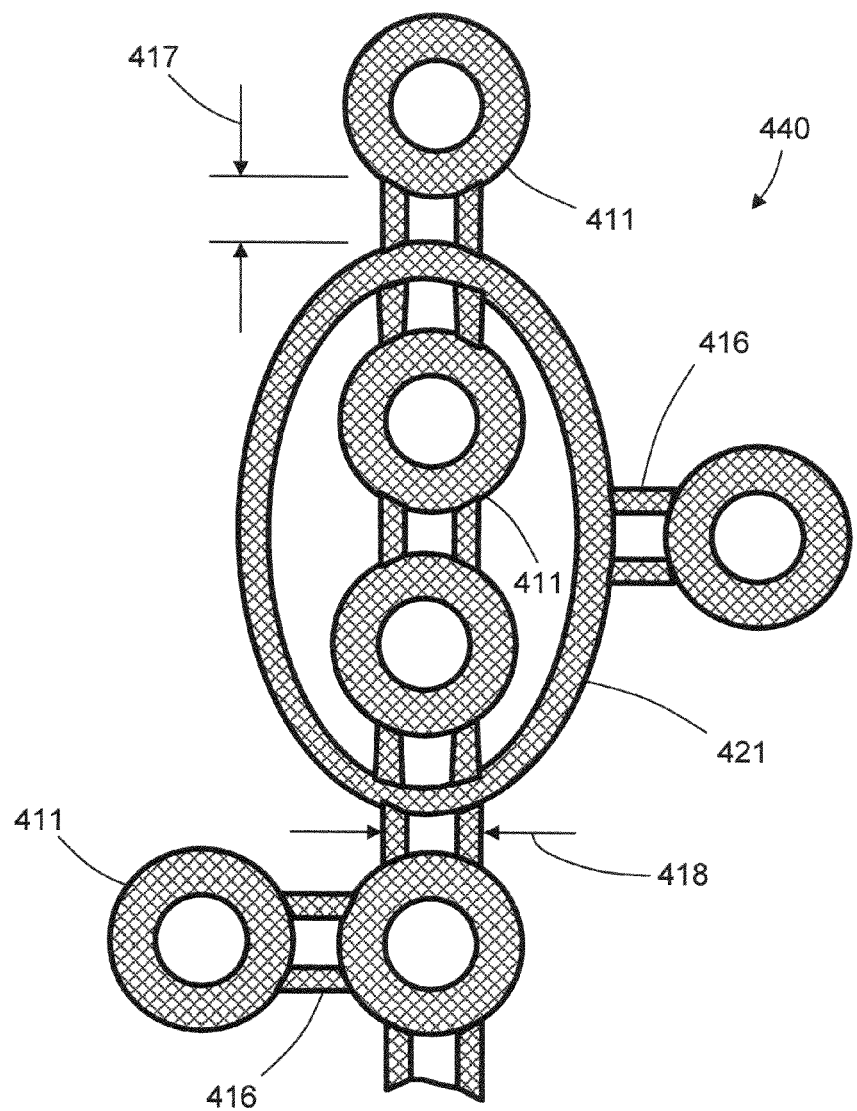
Figure 4E:
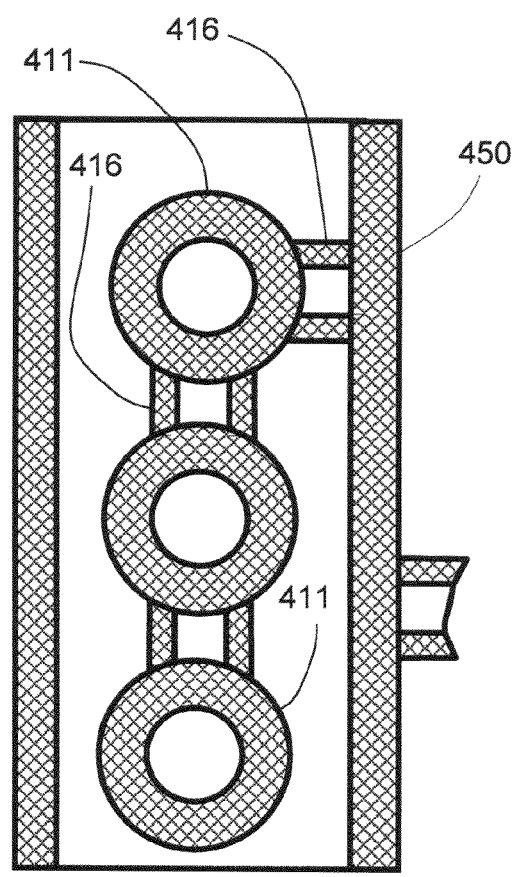

FIG. 4B schematically depicts a hybrid fullerene chain 420, which is a high-aspect ratio configuration of spherical carbon fullerene onions 411 connected by carbon nanotubes 412 and also includes multi-walled carbon nano-tube shells 419 surrounding one or more of the spherical carbon fullerene onions 411. In one embodiment, carbon nanotubes 412 are single-walled nanotubes and in another embodiment, carbon nanotubes 412 are multi-walled nanotubes. FIG. 4C schematically depicts a hybrid fullerene chain 430, which is a high-aspect ratio configuration of a plurality of spherical carbon fullerene onions 411 connected by multi-walled carbon nanotubes 416. As shown, multi-walled carbon nanotubes 416 form relatively low-aspect ratio connections between spherical carbon fullerene onions 411, where the length 417 of each multi-walled carbon nanotube 412 is approximately equal to the diameter 418 thereof. FIG. 4D schematically depicts a hybrid fullerene chain 440, which is a high-aspect ratio configuration of spherical carbon fullerene onions 411 connected by multi-walled carbon nanotubes 416 and also includes one or more multi-walled carbon nano-tube shells 421 surrounding one or more of the spherical carbon fullerene onions 411. FIG. 4E depicts a cross-sectional view of a multi-wall carbon nano-tube 450, which may form part of a high-aspect ratio structure contained in mesoporous carbon material 110. As shown, multi-wall carbon nano-tube 450 contains one or more spherical carbon fullerene onions 411 connected to each other and to carbon nano-tube 450 by multi-walled carbon nanotubes 416, where the spherical carbon fullerene onions 411 are contained inside the inner diameter of carbon nano-tube 450. A deposition process for forming hybrid fullerene chains 410, 420, 430, 440, and 450 is described in detail in step 604 of FIG. 6.

Figure 5A:
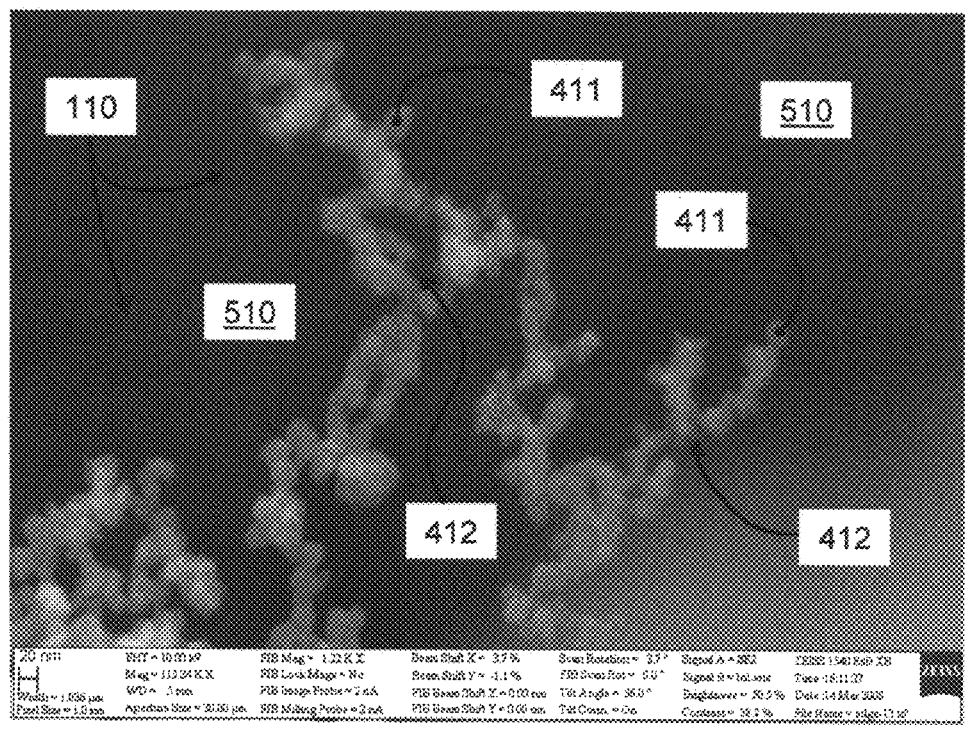
FIG. 5A is a scanning electron microscopy (SEM) image of a mesoporous carbon material showing carbon fullerene onions formed into high-aspect ratio hybrid fullerene chains, according to embodiments of the invention.
Figure 5B:
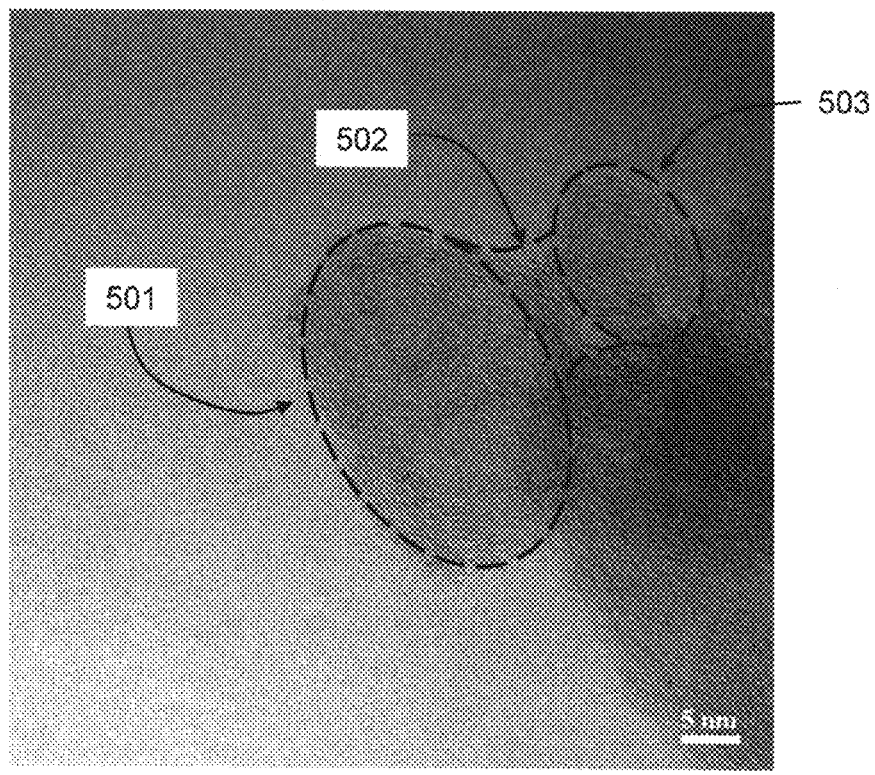
FIG. 5B is a transmission electron microscopy (TEM) image of a multi-walled shell connected by a carbon nanotube to another fullerene onion, according to an embodiment of the invention.

FIG. 5A is a SEM image of mesoporous carbon material 110 showing spherical carbon fullerene onions 411 formed into high-aspect ratio hybrid fullerene chains, according to embodiments of the invention. In some locations, carbon nanotubes 412 connecting spherical carbon fullerene onions 411 are clearly visible. The empty volume 510 between the three-dimensional lattice of interconnected carbon fullerenes retains the fluid portion of the electrolyte when mesoporous carbon material 110 acts as an intercalation layer. FIG. 5B is a TEM image of a multi-walled shell 501 connected by a carbon nanotube 502 to another fullerene onion 503, according to an embodiment of the invention.

Methods for forming two carbon fullerene onions and carbon nano-tubes are known. However, one of skill in the art will appreciate that hybrid fullerene chains 410, 420, 430, 440, and 450, according to embodiments of the invention, enable the formation of mesoporous carbon material 110 on a conductive substrate. First, such hybrid fullerene chains have extremely high surface area. In addition, due to the nano-scale self-assembly process by which they are formed, the hybrid fullerene chains forming mesoporous carbon material 110 also possess high tensile strength, electrical conductivity, heat resistance, and chemical inactivity. Further, the method of forming such structures is well-suited to the formation of a high-surface-area electrode, since the hybrid fullerene chains forming mesoporous carbon material 110 are mechanically and electrically coupled to a conductive substrate as they are formed, rather than being formed in a separate process and then deposited onto a conductive substrate.

Figure 2D:
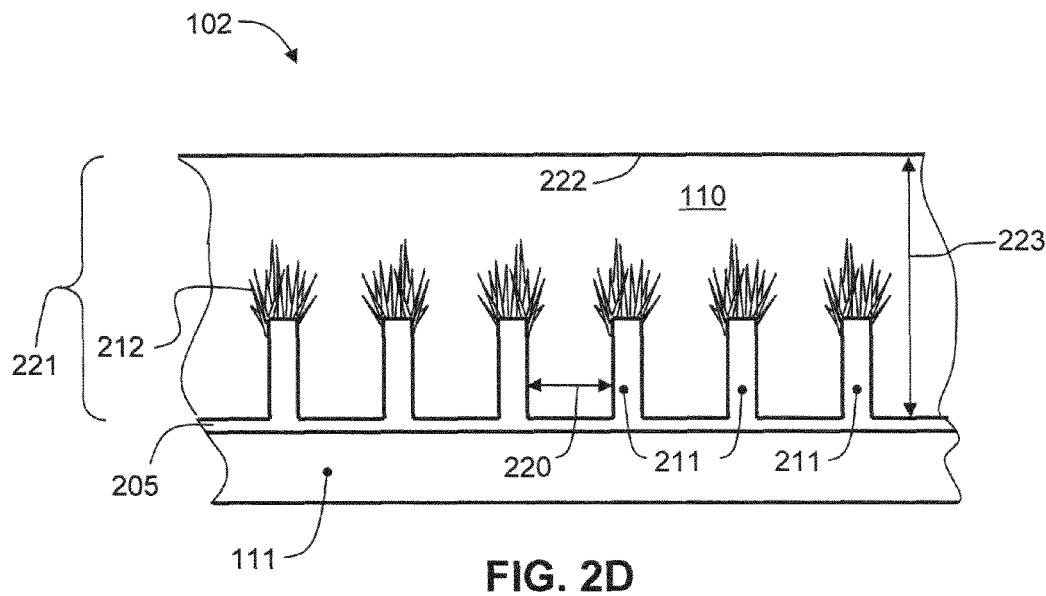

In one embodiment, a CVD-like process is used to conformally deposit mesoporous carbon material 110 on conductive microstructures 200, as illustrated in FIG. 2C. Details of the CVD-like process are described below in step 604 of FIG. 6. Mesoporous carbon material 110 forms on virtually all exposed surfaces of conductive microstructures 200, including columnar projections 211 and dendritic structures 212, thereby filling the gaps 220 between conductive microstructures 200. Deposition of mesoporous carbon material 110 on conductive microstructures 200 may produce peaks 225 and troughs 226 on the surface of mesoporous carbon material 110. After depositing mesoporous carbon material 110 to fill gaps 220, further deposition of mesoporous carbon material 110 forms a layer 221 on conductive microstructures 200 having a substantially planar surface 222, as depicted in FIG. 2D. Substantially planar surface 222 results by depositing enough mesoporous carbon material 110 to cover peaks 225 and troughs 226 apparent in FIG. 2C. In one example, the average peak to valley variation across the substantially planar surface 222 is characterized as being between about 5% and about 50% the thickness of the layers deposited over the current collector 111. It should be noted that on the microscopic scale the surface topography of the mesoporous carbon material 110 will be large due to the porous nature of the mesoporous carbon material 110 deposited on the high surface area columnar projections 211, while on the macroscopic scale of the surface variation can be comparatively small thus enabling the creation of an electrode that can be reliably coupled to other parts of an electrochemical device. In another embodiment, the macroscopic variation in the planarity of the substantially planar surface 222 is characterized such that the variation in thickness of the layers deposited over the surface of the current collector 111 is between about 90% and about 110% of the average thickness. In general, the macroscopic variation in the planarity is related to the variation of the peaks on the top surface of the formed layer over a wide area. It should be noted that the planarity can be affected by the planarity of the surface of the current collector 111.

Referring to FIG. 2D, the thickness 223 of layer 221 is variable depending on the intercalation layer requirements of the energy storage device that contains anode structure 102. For example, in a Li-ion battery, mesoporous carbon material 110 can serve as an intercalation layer for lithium ions within the anode structure 102. In such an embodiment, a greater thickness 223 of layer 221 results in a greater energy storage capacity for electrode 100, but also a greater distance for the charge to travel before entering current collector 111, which can slow charge/discharge times and increase internal resistance. Consequently, thickness 223 of mesoporous carbon material 110 may range from approximately 30 microns to 50 microns or more, depending on the desired functionality of electrode 100.

Figure 3:
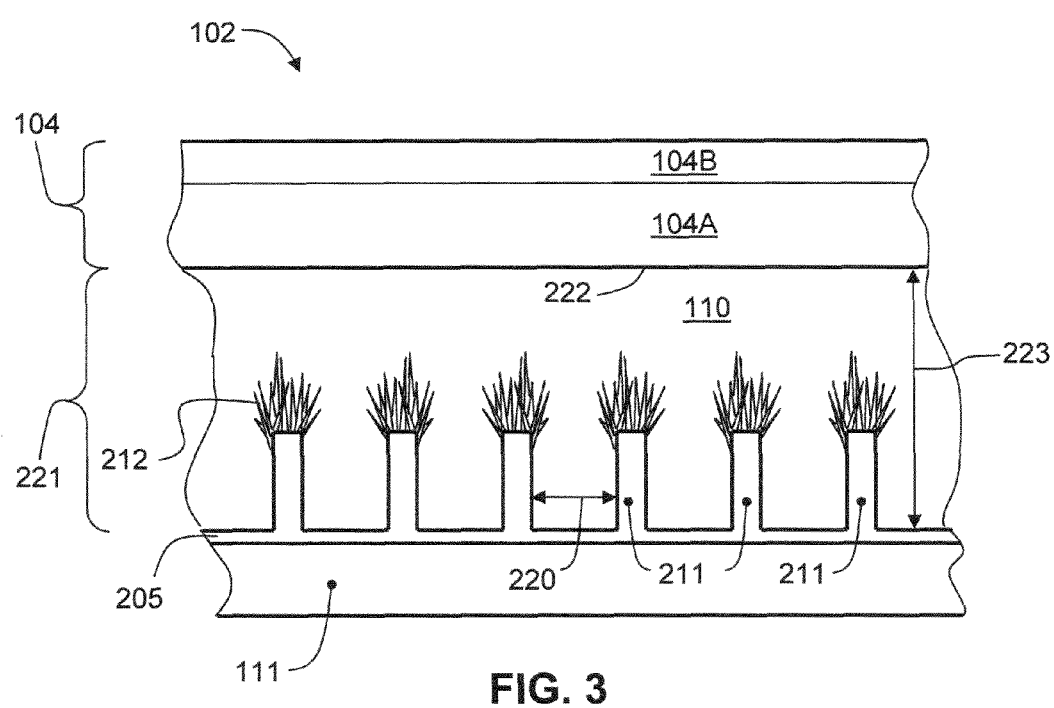
FIG. 3 illustrates an anode structure after the formation of separator layer on a mesoporous carbon material, according to an embodiment of the invention.

FIG. 3 illustrates anode structure 102 after the formation of separator layer 104 on mesoporous carbon material 110, according to an embodiment of the invention. Separator layer 104 is a dielectric, porous layer that separates anode structure 102 from cathode structure 103. The porous nature of separator layer 104 allows ions to travel between mesoporous carbon material 110 of anode structure 102 and intercalation host material 112 of cathode structure 103 via the liquid portion of the electrolyte contained in the pores of separator layer 104. In one embodiment, separator layer 104 may include a polymerized carbon layer 104A and a dielectric layer 104B.

Polymerized carbon layer 104A comprises a densified layer of mesoporous carbon material 110 on which dielectric layer 104B may be deposited or attached. Polymerized carbon layer 104A has a significantly higher density than mesoporous carbon material 110, thereby providing a structurally robust surface on which to deposit or attach subsequent layers to form anode structure 102. In one embodiment, the density of polymerized carbon layer 104A is greater than the density of mesoporous carbon material 110 by a factor of approximately 2 to 5. In one embodiment, the surface of mesoporous carbon material 110 is treated with a polymerization process to form polymerized carbon layer 104A on mesoporous carbon material 110. In such an embodiment, any known polymerization process may be used to form polymerized carbon layer 104A, including directing ultra-violet and/or infra-red radiation onto the surface of mesoporous carbon material 110. An exemplary polymerization process for treating mesoporous carbon material 110 to form polymerized carbon layer 104A is described below in step 605 of FIG. 6. In another embodiment, polymerized carbon layer 104A is deposited in-situ as a final step in the formation of mesoporous carbon material 110. In such an embodiment, one or more process parameters, e.g., hydrocarbon precursor gas temperature, are changed in a final stage of the deposition of mesoporous carbon material 110, so that polymerized carbon layer 104A is formed on mesoporous carbon material 110, as shown. The modified deposition process for forming polymerized carbon layer 104A is described below in step 605 of FIG. 6. Forming the polymerized carbon layer 104A from a portion of the mesoporous carbon material 110 may be advantageous to avoid interfacial issues created between a separately deposited polymerized carbon layer 104A and the mesoporous carbon material 110, and also reduce the complexity of the processes that would be required to separately add a polymerized carbon layer 104A over the mesoporous carbon material 110.

Dielectric layer 104B comprises a polymeric material and may be deposited as an additional polymeric layer on polymerized carbon layer 104A. Dielectric polymers that may be deposited on polymerized carbon layer 104A to form dielectric layer 104B are discussed above in conjunction with FIG. 1. Alternatively, in one embodiment, polymerized carbon layer 104A may also serve as the dielectric portion of separator layer 104, in which case separator layer 104 consists essentially of a single polymeric material, i.e., polymerized carbon layer 104A.

In sum, anode structure 102 comprises several layers of materials, each of which may be formed using thin-film deposition techniques. Because anode structure 102 may be formed on a flexible substrate, very large surface area substrates may be used, e.g., on the order of 1 m×1 m or larger. In addition, formation of anode structure 102 on a flexible substrate enables the use of roll-to-roll processing techniques, thereby avoiding the more complex handling, lower throughput, and higher costs associated with single-substrate processing.

Figure 6:
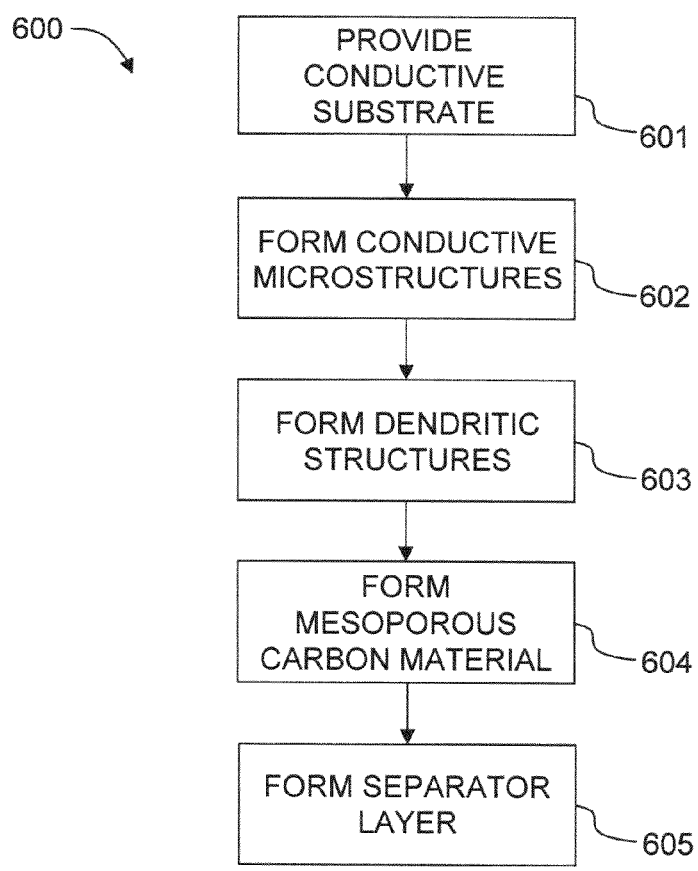
FIG. 6 is a process flow chart summarizing a method for forming an anode structure, according to one embodiment of the invention.

FIG. 6 is a process flow chart summarizing a method 600 for forming anode structure 102 as illustrated in FIGS. 1 and 2A-D, according to one embodiment of the invention. In step 601, a substrate substantially similar to current collector 111 in FIG. 1 is provided. As detailed above, the substrate may be a conductive substrate, such as metallic foil, or a non-conductive substrate that has an electrically conductive layer formed thereon, such as a flexible polymer or plastic having a metallic coating.

In step 602, conductive columnar microstructures substantially similar to columnar projections 211 in FIGS. 2A are formed on a conductive surface of the substrate (e.g., current collector 111). In one embodiment, the columnar projections 211 may have a height of 5 to 10 microns and/or have a measured surface roughness of about 10 microns. In another embodiment, the columnar projections 211 may have a height of 15 to 30 microns and/or have a measured surface roughness of about 20 microns. A diffusion-limited electrochemical plating process is used to form columnar projections 211. In one embodiment, the three dimensional growth of columnar projections 211 is performed using a high plating rate electroplating process performed at current densities above the limiting current ($i_L$). Formation of the columnar projections 211 includes establishing process conditions under which evolution of hydrogen results, thereby forming a porous metal film. In one embodiment, such process conditions are achieved by performing at least one of: decreasing the concentration of metal ions near the surface of the plating process; increasing the diffusion boundary layer; and reducing the organic additive concentration in the electrolyte bath. It should be noted that the diffusion boundary layer is strongly related to the hydrodynamic conditions. If the metal ion concentration is too low and/or the diffusion boundary layer is too large at a desired plating rate, the limiting current ($i_L$) will be reached. The diffusion-limited plating process created when the limiting current is reached forms the increase in plating rate by the application of more voltage to the surface of the plating process, e.g., a seed layer surface on current collector 111. When the limiting current is reached, a low density columnar metal layer, i.e., columnar projections 211, is produced due to the evolution of gas and resulting dendritic type film growth that occurs due to the mass-transport-limited process.

Formation of columnar projections 211 may take place in a processing chamber. A processing chamber that may be adapted to perform one or more of the process steps described herein may include an electroplating chamber, such as the SLIMCELL® electroplating chamber available from Applied Materials, Inc. of Santa Clara, Calif. A preferred approach for forming columnar projections 211 is roll-to-roll plating. Exemplary roll-to-roll plating equipment and processes suitable for forming columnar projections 211 are more fully described in co-pending U.S. Patent Application Ser. No. 61/117,535, entitled, "Apparatus and Method for Forming 3D Nanostructure Electrode for Electrochemical Battery and Capacitor," filed on Nov. 24, 2008, and in U.S. Patent Application Ser. No. 61/149,993, entitled, "Porous Three Dimensional Copper, Tin, Copper-Tin, Copper-Tin-Cobalt, And Copper-Tin-Cobalt-Titanium Electrodes For Batteries And Ultra Capacitors," filed on Feb. 4, 2009, both incorporated herein by reference to the extent not inconsistent with the invention. Other processing chambers and systems, including those available from other manufactures may also be used to practice the embodiments described herein.

The processing chamber includes a suitable plating solution. Suitable plating solutions that may be used with the processes described herein include electrolyte solutions containing a metal ion source, an acid solution, and optional additives.

In one embodiment, to increase planarization power, the plating solution can used in step 602 contains at least one or more acid solutions. Suitable acid solutions include, for example, inorganic acids such as sulfuric acid, phosphoric acid, pyrophosphoric acid, perchloric acid, acetic acid, citric acid, combinations thereof, as well as acid electrolyte derivatives, including ammonium and potassium salts thereof.

In one embodiment, the metal ion source within the plating solution used in step 602 is a copper ion source. In one embodiment, the concentration of copper ions in the electrolyte may range from about 0.1 M to about 1.1 M, preferably from about 0.4 M to about 0.9 M. Useful copper sources include copper sulfate ($CuSO_4$), copper chloride ($CuCl_2$), copper acetate ($Cu(CO_2CH_3)_2$), copper pyrophosphate ($Cu_2P_2O_7$), copper fluoroborate ($Cu(BF_4)_2$), derivatives thereof, hydrates thereof or combinations thereof. The electrolyte composition can also be based on the alkaline copper plating baths (e.g., cyanide, glycerin, ammonia, etc) as well.

In one example, the electrolyte is an aqueous solution that contains between about 45 and 85 g/l of copper sulfate pentahydrate ($CuSO_4.5(H_2O)$), between about 185 and about 260 g/l of sulfuric acid ($H_2SO_4$), and about 0 to 50 ppm of hydrochloric acid (HCl). In some cases it is desirable to add a low cost pH adjusting agent, such as potassium hydroxide (KOH) or sodium hydroxide (NaOH) to form an inexpensive electrolyte that has a desirable pH to reduce the cost of ownership required to form a metal contact structure for a solar cell. In some cases it is desirable to use tetramethylammonium hydroxide (TMAH) to adjust the pH.

In one embodiment, it may be desirable to add a second metal ion to the primary metal ion containing electrolyte bath (e.g., copper ion containing bath) that will plate out or be incorporated in the growing electrochemically deposited layer or on the grain boundaries of the electrochemically deposited layer. The formation of a metal layer that contains a percentage of a second element can be useful to reduce the intrinsic stress of the formed layer and/or improve its electrical and electromigration properties. In one example, it is desirable to add an amount of a silver (Ag), nickel (Ni), zinc (Zn), or tin (Sn) metal ion source to a copper plating bath to form a copper alloy that has between about 1% and about 4% of the second metal in the deposited layer.

Columnar projections 211 are formed using a diffusion limited deposition process. The current densities of the deposition bias are selected such that the current densities are above the limiting current ($i_L$). The columnar metal film is formed due to the evolution of hydrogen gas and resulting dendritic film growth that occurs due to the mass transport limited process. During formation of columnar projections 211, the deposition bias generally has a current density of about 10 $A/cm^2$ or less, preferably about 5 $A/cm^2$ or less, more preferably at about 3 $A/cm^2$ or less. In one embodiment, the deposition bias has a current density in the range from about 0.05 $A/cm^2$ to about 3.0 $A/cm^2$. In another embodiment, the deposition bias has a current density between about 0.1 $A/cm^2$ and about 0.5 $A/cm^2$. In yet another embodiment, the deposition bias has a current density between about 0.05 $A/cm^2$ and about 0.3 $A/cm^2$. In yet another embodiment, the deposition bias has a current density between about 0.05 $A/cm^2$ and about 0.2 $A/cm^2$. In one embodiment, this results in the formation of a columnar metal layer between about 1 micron and about 300 microns thick on the copper seed layer. In another embodiment, this results in the formation of a columnar metal layer between about 10 microns and about 30 microns. In yet another embodiment, this results in the formation of a columnar metal layer between about 30 microns and about 100 microns. In yet another embodiment, this results in the formation of a columnar metal layer between about 1 micron and about 10 microns, for example, about 5 microns.

In one embodiment, columnar projections 211 are formed in step 602 using an electrolyte that is an aqueous solution containing 65 g/l of copper sulfate pentahydrate ($CuSO_4.5(H_2O)$), 220 g/l of sulfuric acid ($H_2SO_4$), and 0 ppm of hydrochloric acid (HCl). In such an embodiment, the deposition bias has a current density of 3.0 $A/cm^2$, and the process is performed at about 24° C.

Additional process examples for forming columnar projections 211 on a conductive substrate are further described in U.S. Provisional Patent Application Ser. No. 61/149,993, entitled "Porous Three Dimensional Copper, Tin, Copper-Tin, Copper-Tin-Cobalt, & Copper-Tin-Cobalt-Titanium Electrodes for Batteries and Ultra Capacitors," filed on Feb. 4, 2009, which is incorporated herein by reference to the extent not inconsistent with the embodiments described herein.

In step 603, conductive dendritic structures substantially similar to dendritic structures 212 in FIGS. 2A-D are formed on the substrate. The conductive dendritic structures may be formed on the conductive microstructures of step 602, or formed directly on the flat conductive surface of the substrate. In one embodiment, an electrochemical plating process may be used to form the conductive dendritic structures, and in another embodiment, an electroless plating process may be used.

Figure 7:
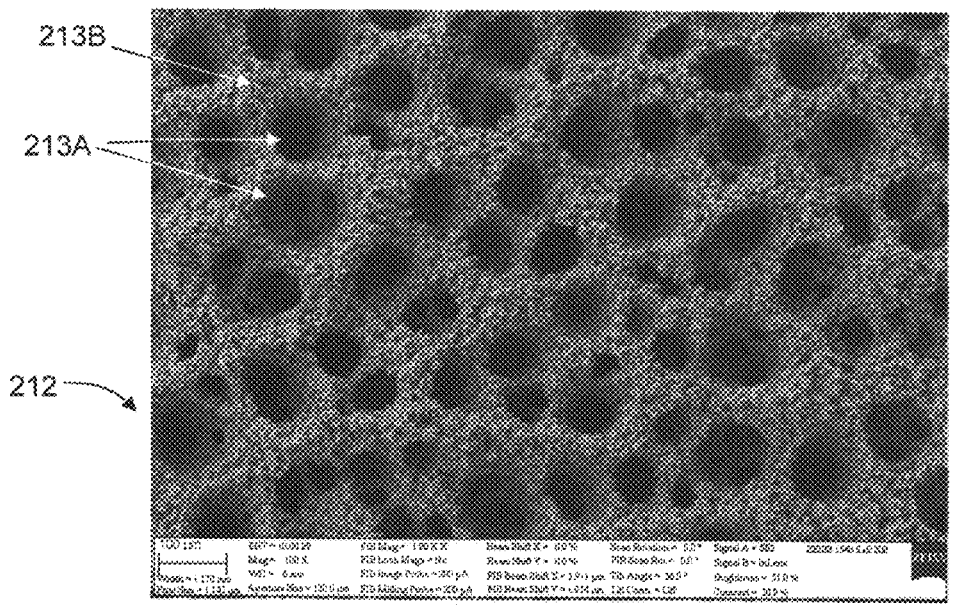
FIG. 7 is a representation of a SEM image of dendritic structures having pores when deposited according to embodiments described herein.

The electrochemical plating process for forming conductive dendritic structures similar to dendritic structures 212 involves exceeding the electro-plating limiting current during plating to produce an even lower-density dendritic structure than columnar projections 211 formed at step 602. Otherwise, the process is substantially similar to the electroplating process of step 602 and may be performed in-situ, and thus may be performed immediately following step 602 in the same chamber. The electric potential spike at the cathode during this step is generally large enough so that reduction reactions occur, hydrogen gas bubbles form as a byproduct of the reduction reactions at the cathode, while dendritic structures are constantly being formed on the exposed surfaces. The formed dendrites grow around the formed hydrogen bubbles because there is no electrolyte-electrode contact underneath the bubble. In a way, these microscopic bubbles serve as "templates" for dendritic growth. Consequently, these anodes have many pores, as seen in FIG. 7. FIGS. 7, 12A-12D and 13A-13D is a representation of a SEM image of dendritic structures 212 having pores when deposited according to embodiments described herein.

In one embodiment, one objective is to minimize the size of evolved gas bubbles to produces smaller pores in dendritic structures 212. As the bubbles rise, they may combine, or coalesce, with nearby bubbles to form larger dendrite templates. The artifacts remaining from this entire process are relatively large pores in the dendritic growth. In order to maximize surface area of dendritic structures 212, it is preferable to minimize the size of such pores, which can be achieved with the addition of organic additives, such as organic acids, which can adjust the electrochemical activity and/or surface tension of the electrolyte solution at the surface of the anode structure. In one embodiment, the surface area of an anode structure 102, or electrode, containing the columnar projections 211 and/or the dendritic structures 212 has a surface area that is at least 5 times the surface area of a conventional "as-deposited" substrate surface. Typical, conventional "as-deposited" substrate surfaces include a conventional plated copper foil surface (e.g., mill-finish, matte finish), electrolessly deposited material surface, PVD deposited material surface or CVD deposited material surface. In one embodiment, the surface area of an anode structure 102, or electrode, formed using one or more of the processes discussed above (e.g., step 602 and/or step 603) has a surface area that is at least 25 times the surface area of a conventional as deposited substrate surface. In yet another embodiment, the surface area of an anode structure 102, or electrode, formed using the processes discussed above has a surface area that is at least 150 times the surface area of a conventional as deposited substrate surface. In yet another embodiment, the surface area of an anode structure 102, or electrode, formed using the processes discussed above has a surface area that is at least 250 times the surface area of a conventional as deposited substrate surface. It should be noted that, while the disclosure above discusses a two step process to form the an anode structure 102, this configuration is not intended to limiting as to the scope of the invention described herein, since a single step, or many step, process can be used to form a high surface area electrode without deviating from the basic scope of the invention described herein.

In general, an anode structure 102 that has columnar projections 211 and/or dendritic structures 212 formed thereon will have a surface that has one or more forms of porosity formed thereon. In one embodiment, the surface of the anode structure 102 comprises macro-porosity structure 214A (FIGS. 7 and 11-14) that has a plurality of macroscopic pores 213A that are about 100 microns or less in size. As shown in FIGS. 7 and 12-13, the macro-porosity structure 214A may generally comprise a plurality of macroscopic pores 213A. It is believed that the size and density of the macroscopic pores 213A in the layer can be controlled by controlling the electroplating current density, surface tension of the electrolyte relative to the surface of the substrate, metal-ion concentration in the bath, roughness of the substrate surface, and the fluid dynamic flow. In one embodiment, the macroscopic pores 213A are sized within a range between about 5 and about 100 microns ($\mu$m). In another embodiment, the average size of the macroscopic pores 213A is about 30 microns in size. The surface of the anode structure 102 may also comprise a second type, or class, of pore structures that are formed between the columnar projections 211 and/or main central bodies of the dendrites, which is known as meso-porosity 214B (FIGS. 7 and 11-14) that include a plurality of meso-pores 213B. The meso-porosity 214B may comprise a plurality of meso-pores 213B that are less than about 1 micron in size. In another embodiment, the meso-porosity 214B may comprise a plurality of meso-pores 213B that are between about 100 nm to about 1000 nm in size. In one embodiment, the meso-pores 213B are between about 20 nm to about 100 nm in size. Additionally, the surface of the anode structure 102 may also comprise a third type, or class, of pore structures that are formed between the dendrites, which is known as nano-porosity 214C (FIG. 11). In one embodiment, the nano-porosity 214C may comprise a plurality of nano-pores 213C that is sized less than about 100 nm. In another embodiment, the nano-porosity 214C may comprise a plurality of nano-pore 213C that are less than about 20 nm in size. The combination of macro-porosity, meso-porosity, and nano-porosity can increases surface area of the electrode tremendously, as discussed below in conjunction with FIG. 14.

FIGS. 12A-12D are representative SEM images of copper containing dendritic structures, such as the columnar projections 211 and dendritic structures 212, which were formed using the electrochemical processes described herein. FIG. 13A-13D are representative SEM images of copper tin (CuSn) containing dendritic structures, such as the columnar projections 211 and dendritic structures 212, which were formed using the electrochemical processes described herein.

Figure 14:
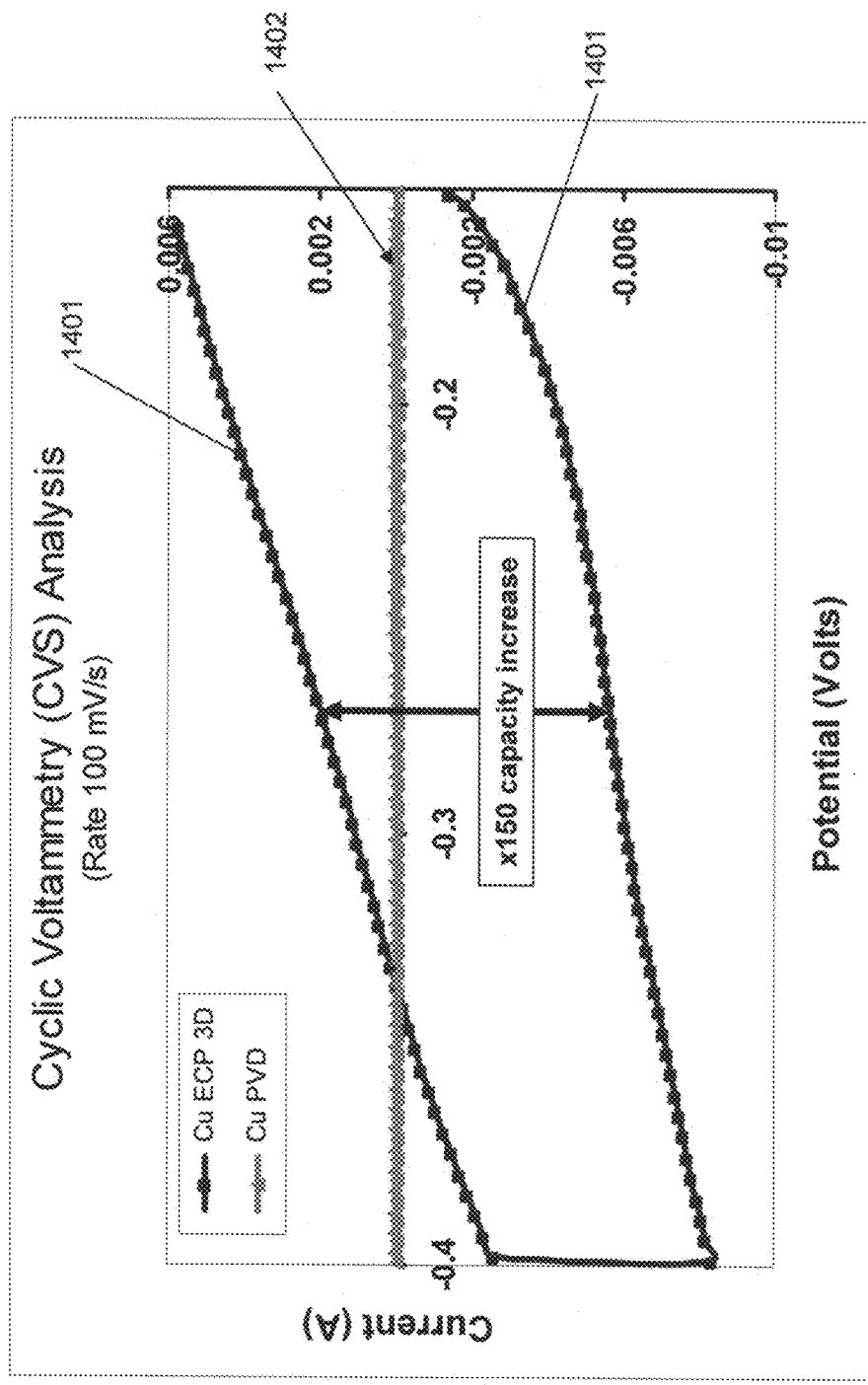
FIG. 14 is graphical representation of the effect of forming a copper conductive microstructure versus a copper conformal film on the battery capacity using a CVS method according to embodiments described herein.

FIG. 14 is a graph that illustrates the benefits of forming a copper containing dendritic structure using the electrochemical deposition processes described herein versus a conventional "as-deposited" copper electrode surfaces formed by a physical vapor deposition (PVD) process. The graphical data was collected using cyclic voltammetry (CVS) techniques and illustrates the increase in battery capacity (~150 times), due to the in the increase in electrode surface area created by the electrochemical processes described herein versus conventional "as-deposited" copper electrodes. The increase in capacity is shown by the increase in the amount of hysteresis created for each of the structures during the forward and reverse sweeps of the voltage during the CVS process. One will note that the conventional copper electrode formed by a physical vapor deposition (PVD) has a negligible hysteresis (i.e., curve 1402) versus the hysteresis created by the copper containing dendritic structures formed using the electrochemical deposition processes described herein (i.e., curve 1401).

An anode structure 102 that has columnar projections 211 and/or dendritic structures 212 formed thereon may have a porosity that is between 50%-90% as compared to a solid film formed from the same material. In this configuration, the bulk of the thickness of a formed layer containing the columnar projections 211 and/or dendritic structures 212 are pores, or open space. In one embodiment, the porosity is between 70%-90% of a solid film. In another embodiment, the porosity is about 80% of a solid film. Viewing the formed layer in another way, the density of a layer having columnar projections 211 and/or dendritic structures 212 will have a density that is between about 10% and about 50% of a solid film. In this configuration, for example, the density of a formed copper layer that comprises columnar projections 211 and/or dendritic structures 212 may have a density between about 0.893 g/cm$^3$ and about 4.47 g/cm$^3$, assuming that a solid copper layer has a density of about 8.93 g/cm$^3$. In another embodiment, the density of a formed layer comprising the columnar projections 211 and/or dendritic structures 212 has a density that is between about 10% and about 30% of a solid film. In one example, the density of a formed layer comprising the columnar projections 211 and/or dendritic structures 212 has a density that is about 20% of a solid film.

For lithium ion batteries and super capacitors, it is important to have a high surface area anode to maximize energy and power storage density. To analyze the surface area, it may be useful to physically view the surface. However, because the greatest surface area is achieved beyond the scope of light microscopes, other techniques must be used. Scanning Electron Microscopes (SEMs) are most commonly used due to their versatility and simplicity. A SEM allows users to topo-scopically view the anode, giving the user a view of the high surface area structures. However, often it is advantageous to study the thickness as well as the topology of an anode, since the surface area is derived from all 3 dimensions. In one embodiment, a Focused Ion Beam (FIB) may be used to slice a thin section out of the anode. The anode can then be tilted so that the vertical slice can be viewed, allowing the user to derive the depth. In another embodiment, a comprehensive surface area measurement is taken by taking advantage of the direct relationship between the capacitance and surface area of an electrode. Cyclic voltammetry methods may be used to derive capacitance based on a ramping voltage (dV/dt) and current (i).

In sum, when an electrochemical plating process is used to form dendritic structures 212 on columnar projections 211, a columnar metal layer may be formed at a first current density by a diffusion limited deposition process, followed by the three dimensional growth of dendritic structures 212 at a second current density, or second applied voltage, that is greater than the first current density, or first applied voltage.

Alternatively, an electroless deposition process may be used to form dendritic structures 212. In such an embodiment, dendritic structures 212 are comprised of chains of catalytic metal nano-particles. Metal nano-particles known to act as catalysts for forming carbon nano-tubes include iron (Fe), palladium (Pd), platinum (Pt) and silver (Ag), and embodiments of the invention contemplate that the catalytic nano-particles that form dendritic structures 212 may include such catalytic materials. According to one embodiment, the electroless deposition process is achieved by immersing the substrate in a silver nitrate ($AgNO_3$) solution or other silver salt solution.

In step 604, a mesoporous carbon material is deposited on the conductive microstructures formed in steps 602 and 603 by a CVD-like process. Unlike prior art methods for forming Fullerenes, no catalytic nano-particles, such as iron (Fe) or nano-diamond particles, are used in step 604 to form the mesoporous carbon material. Instead, the CVD-like process as described herein allows the carbon atoms in a hydrocarbon precursor gas to undergo a continuous nano-scale self-assembly process on the catalytic surface.

First, a high molecular weight hydrocarbon precursor, which may be a liquid or solid precursor, is vaporized to form a hydrocarbon-containing precursor gas. A hydrocarbon precursor having 18 or more carbon atoms may be used, such as $C_{20}H_{40}$, $C_{20}H_{42}$, $C_{22}H_{44}$, etc. The precursor is heated to between 300° C. and 1400° C., depending on the properties of the particular hydrocarbon precursor used. One of skill in the art can readily determine the appropriate temperature at which the hydrocarbon precursor should be heated to form a vapor for such a process.

Next, the hydrocarbon precursor vapor is directed across the exposed surfaces of the conductive substrate (e.g., current collector 111), where the temperature of the conductive substrate is maintained at a relatively cold temperature, e.g., no greater than about 220° C. The temperature at which the conductive surface is maintained during this process step may vary as a function of substrate type. For example, in one embodiment, the substrate includes a non-temperature resistant polymer, and may be maintained at a temperature between about 100° C. and 300° C. during step 604. In another embodiment, the substrate is a copper substrate, such as a copper foil, and may be maintained at a temperature between about 300° C. and 900° C. during step 604. In yet another embodiment, the substrate consists of a more heat-resistant material, such as stainless steel, and is maintained at a temperature of up to about 1000° C. during step 604. The substrate may be actively cooled during the deposition process with backside gas and/or a mechanically cooled substrate support. Alternatively, the thermal inertia of the substrate may be adequate to maintain the conductive surface of the substrate at an appropriate temperature during the deposition process. A carrier gas, such as argon (Ar) or nitrogen ($N_2$), may be used to better deliver the hydrocarbon precursor gas to the surface of the conductive substrate. For improved uniformity of gas flow, the mixture of hydrocarbon precursor vapor and carrier gas may be directed to the conductive surface of the substrate through a showerhead. Both low-vacuum, i.e., near atmospheric, and high-vacuum CVD processes may be used to form the mesoporous carbon material. For improved uniformity of gas flow, the mixture of hydrocarbon precursor vapor and carrier gas may be directed to the conductive surface of the substrate through a showerhead. Alternatively, the hydrocarbon precursor vapor and/or a carrier gas may be introduced into a process chamber via one or more gas injection jets, where each jet may be configured to introduce a combination of gases, or a single gas, e.g., carrier gas, hydrocarbon precursor vapor, etc. Atmospheric and near-atmospheric CVD processes allow deposition onto larger surface area substrates, higher throughput, and lower-cost processing equipment.

Finally, the mesoporous carbon material is formed on the surface of the conductive substrate. Under the conditions so described, the inventors have determined that carbon nano-particles contained in the hydrocarbon precursor vapor will "self-assemble" on the cool surface into mesoporous carbon material 110, i.e., a matrix of three-dimensional structures made up of fullerene onions connected by nanotubes. Thus, no catalytic nano-particles are used to form mesoporous carbon material 110. In addition, the fullerene-containing material that forms mesoporous carbon material 110 does not consist of individual nano-particles and molecules. Rather, mesoporous carbon material 110 is made up of high aspect ratio, carbon chains structures that are bonded to the surface of the conductive substrate. Thus, a subsequent anneal process is not required to bond spherical carbon fullerene onions and carbon nanotubes with each other or with the conductive substrate.

Experimental observations at different times during the self-assembly process by SEM show that self-assembly begins with the formation of scattered individual nano-carbon chains having high aspect ratios. The fullerene onion diameters are in the range of 5-20 nm and the hybrid fullerene chains are up to 20 microns in length. It is believed that the growth of such fullerene chains is initiated on copper grain boundaries and/or defects in the copper lattice. As the self-assembly progresses, the hybrid fullerene chains become interconnected with each other to form a layer of highly porous material, i.e., mesoporous carbon material 110 in FIG. 1. The self-assembly process of interconnected hybrid fullerene chains continues as a self-catalytic process. Layers of 1, 10, 20, 30, 40, and 50 microns thick nano-Carbon material have been observed.

It is noted that the process described in step 604 is substantially different from processes known in the art for depositing carbon nanotube-containing structures on a substrate. Such processes generally require the formation of carbon nanotubes or graphene flakes in one process step, the formation of a slurry containing the pre-formed carbon nanotubes or graphene flakes and a binding agent in a second process step, the application of the slurry to a substrate surface in a third process step, and the anneal of the slurry in a final process step to form an interconnected matrix of carbon molecules on the substrate. The method described herein is significantly less complex, can be completed in a single processing chamber, and relies on a continuous self-assembly process to form high aspect ratio carbon structures on a substrate rather than on an anneal step. The self-assembly process is believed to form carbon structures of greater chemical stability and higher electrical conductivity than slurry-based carbon structures, both of which are beneficial properties for components of energy storage devices. Further, the self-assembly process allows for the use of a wide variety of substrates on which to form the carbon structures, including very thin metal foils and polymeric films, among others.

In one process example, a fullerene-hybrid material substantially similar to mesoporous carbon material 110 is formed on a conductive layer formed on the surface of a non-conductive substrate, where the non-conductive substrate is a heat resistance polymer and the conductive layer is a copper thin-film formed thereon. A precursor containing a high molecular weight hydrocarbon is heated to 300-1400° C. to produce a hydrocarbon precursor vapor. Argon (Ar), nitrogen ($N_2$), air, carbon monoxide (CO), methane ($CH_4$), and/or hydrogen ($H_2$) at a maximum temperature of 700-1400° C. is used as a carrier gas to deliver the hydrocarbon precursor vapor to a CVD chamber having a process volume of approximately 10-50 liters. The flow rate of the hydrocarbon precursor vapor is approximately 0.2 to 5 sccm, the flow rate of the carrier gas is approximately 0.2 to 5 sccm, and the process pressure maintained in the CVD chamber is approximately $10^{-2}$ to $10^{-4}$ Torr. The substrate temperature is maintained at approximately 100° C. to 700° C., and the deposition time is between about 1 second and 60 seconds, depending on the thickness of deposited material desired. In one embodiment, oxygen ($O_2$) or air is also introduced into the process volume of the CVD chamber at a flow rate of 0.2-1.0 sccm at a temperature of between about 10° C. and 100° C. to produce a combustion-like CVD process. A reaction takes place at about 400° C. and 700° C. in a reaction region between the substrate surface and the gas injection jets or showerhead. The above process conditions yield a fullerene-hybrid material substantially similar to mesoporous carbon layer 110, as described herein.

In step 605, a separator layer is formed on the top surface of the mesoporous carbon material to form a complete battery cell substantially similar to anode structure 102 in FIG. 3. The separator layer may be formed in-situ as a final process step in the formation of the mesoporous carbon material by changing some process parameters. In one embodiment, a separator layer is formed on the top surface of the mesoporous carbon material by a polymerization process, which can be achieved by changing the temperature of the substrate and/or by changing the distance between the substrate surface and the gas injection jets or showerhead. In another embodiment, the polymerization process includes irradiating the surface of the mesoporous carbon material with UV radiation.

Alternatively, the separate layer may be a different material deposited in a separate step. Examples of non-conducting permeable separator material that is suitable for use as a separator layer include porous hydrophilic polyethylene, polypropylene, fiberglass mats, and porous glass paper. In addition, separator layer may be made from an ion exchange resin material, polymeric material, or a porous inorganic support. For example, an ionic perfluoronated sulfonic acid polymer membrane, such as Nafion™, available from the E.I. DuPont de Nemours & Co. Other suitable membrane materials include Gore Select™, sulphonated fluorocarbon polymers, the polybenzimidazole (PBI) membrane (available from Celanese Chemicals, Dallas, Tex.), polyether ether ketone (PEEK) membranes and other materials.

Figure 8:
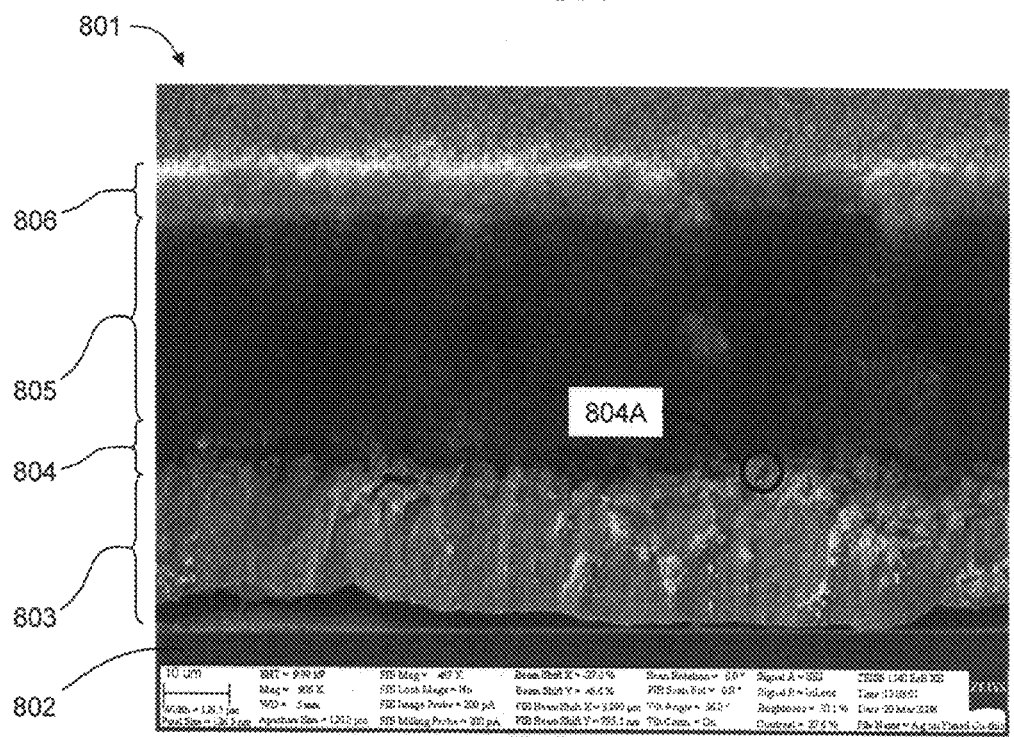
FIG. 8 is a representation of a SEM image of an anodic structure formed by a method according to an embodiment of the invention.

FIG. 8 is a SEM image of a cross-sectional view of an anodic structure 801 formed by method 600, according to an embodiment of the invention. Anodic structure 801 includes a substrate 802 with a copper layer 803 formed thereon that may serve as a current collector. Conductive microstructures 804 are disposed on copper layer 803 and are made up of silver-based nano-particles forming dendritic structures 804A. A layer 805 of mesoporous carbon material is disposed on the dendritic structures 804A, and a densified carbon layer 806 is formed on the upper surface of layer 805. The mesoporous carbon material is a high-performance intercalation material for Li-ion batteries due to long cycle ability and reversible capacity. In addition, the very high contact area formed between the conductive microstructures 804 of the current collector and mesoporous carbon material reduces the internal resistance of the anodic structure.

Embodiments of the invention also contemplate the formation of a complete Li-ion battery cell or supercapacitor using thin-film deposition techniques. In one embodiment, an anode structure is formed using method 600, a cathode structure is formed using a similar method, and the two half cells are then joined together to make a complete Li-ion battery cell or supercapacitor. In another embodiment, a complete battery cell or a series of cells is formed as a single assembly using the thin-film deposition techniques as described herein.

Figure 9:
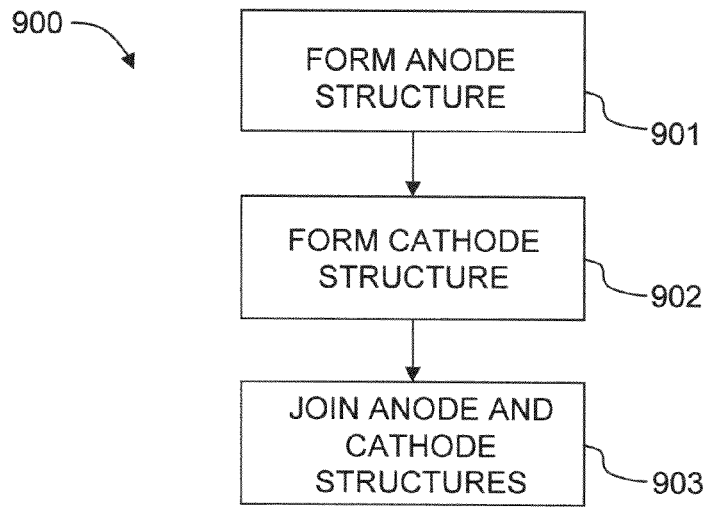
FIG. 9 is a process flow chart summarizing a method for forming a lithium-ion battery, according to one embodiment of the invention.

FIG. 9 is a process flow chart summarizing a method 900 for forming lithium-ion battery 100 as illustrated in FIG. 1, according to one embodiment of the invention. In step 901, an anode structure is formed using method 600.

In step 902, a cathode structure 103 (FIG. 1) is formed using a similar method, in which a conductive substrate serving as a current collector has multiple thin films deposited thereon to form the cathode structure. The method of forming the cathode structure is substantially similar to method 600, except that the Li intercalation material is not a carbon mesoporous layer and instead is a metal oxide as detailed above in conjunction with FIG. 1. Consequently, when forming the cathode structure 103, the mesoporous carbon layer deposition step, i.e., step 604, is replaced with an active cathodic material deposition step. An active cathodic material may be deposited using PVD, thermal evaporation, or other methods known in the art. In one embodiment, the active cathodic material is deposited by coating cathode structure 103 with a slurry containing lithium metal oxide particles.

In step 903, the anode structure and the cathode structure are joined together to form a complete supercapacitor or a battery cell substantially similar in organization and operation to Li-ion battery 100. In one embodiment, a fluidic electrolyte, i.e., either a liquid or polymeric electrolyte, is added to the anode structure and/or the cathode structure prior to joining the two structures together. Techniques for depositing an electrolyte onto the anode structure and/or the cathode structure include: PVD, CVD, wet deposition, spray-on and sol-gel deposition. The electrolyte may be formed from Lithium Phosphorous OxyNitride (LiPON), lithium-oxygen-phosphorus (LiOP), lithium-phosphorus (LiP), lithium polymer electrolyte, lithium bisoxalatoborate (LiBOB), lithium hexafluorophosphate ($LiPF_6$) in combination with ethylene carbonate ($C_3H_4O_3$), and dimethylene carbonate ($C_3H_6O_3$). In another embodiment, ionic liquids may be deposited to form the electrolyte.

Figure 10:
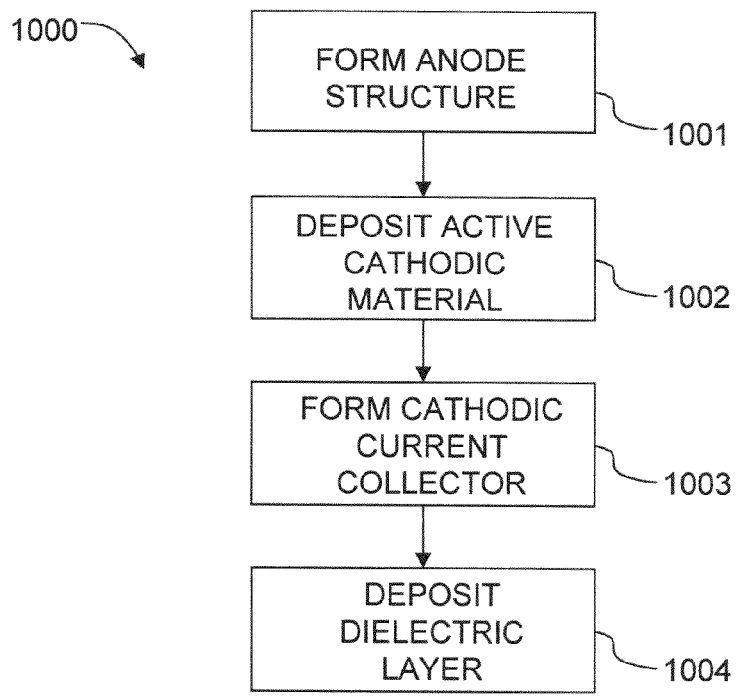
FIG. 10 is a process flow chart summarizing a method for forming a lithium-ion battery 100, according to one embodiment of the invention.
Figure 12B:
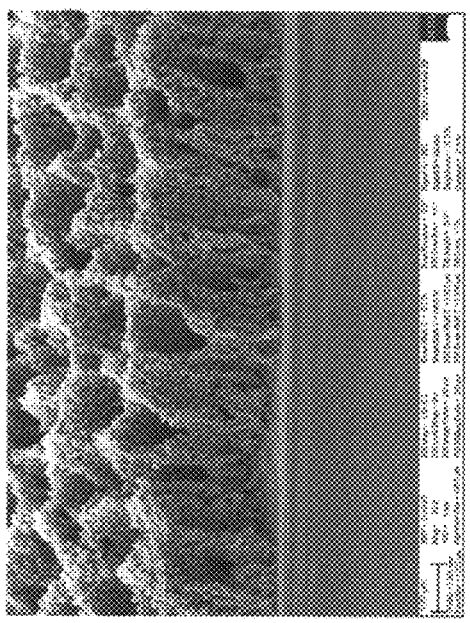
FIG. 12A-12D are representative SEM images of copper containing dendritic structures having pores when deposited according to embodiments described herein.
Figure 12D:
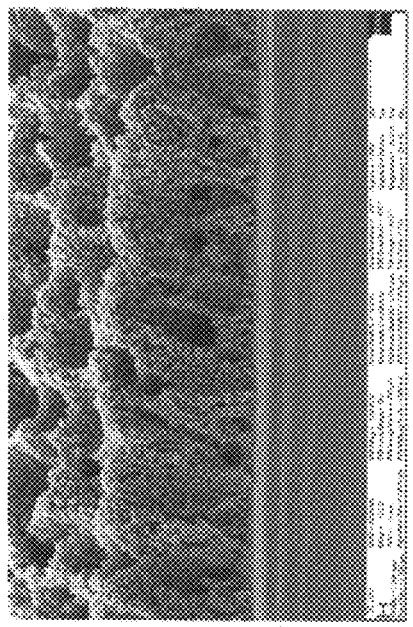
Figure 12A:
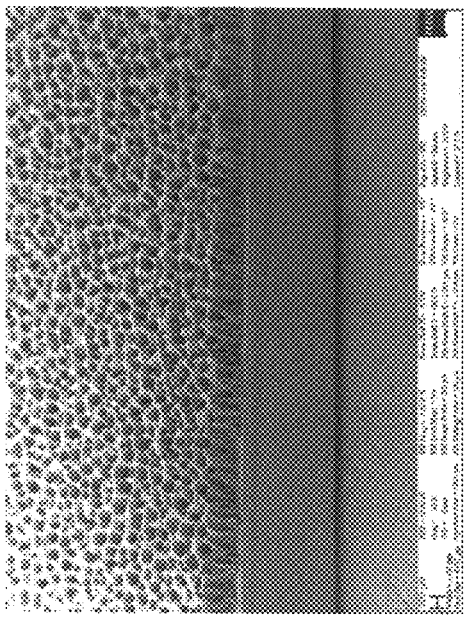
Figure 12C:
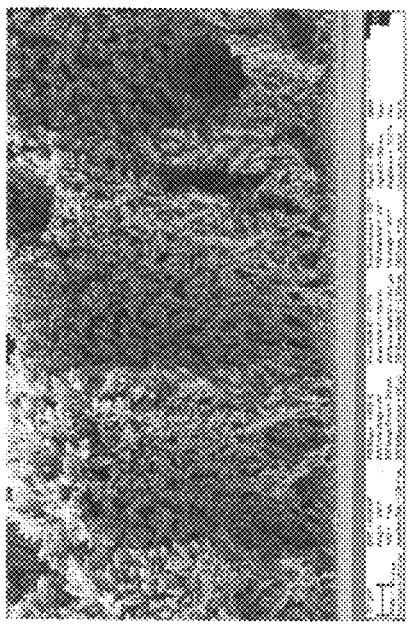
Figure 13A:
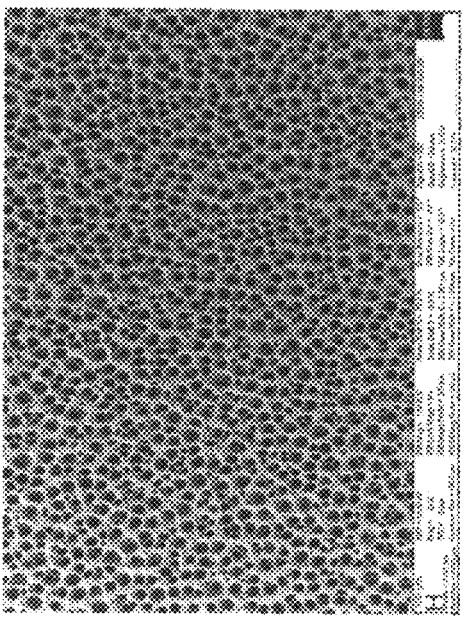
FIG. 13A-13D are representative SEM images of CuSn containing dendritic structures having pores when deposited according to embodiments described herein.
Figure 13B:
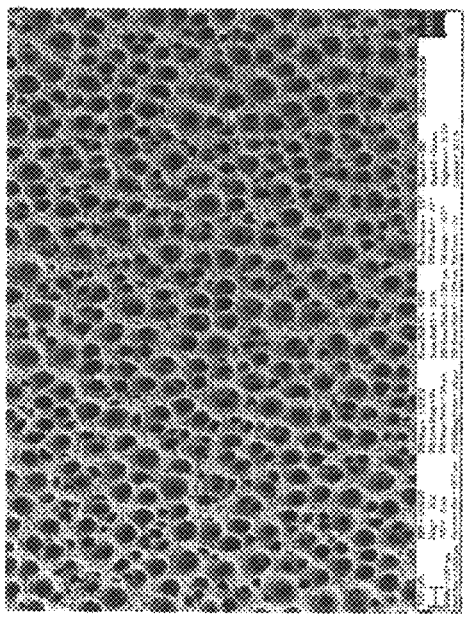
Figure 13C:
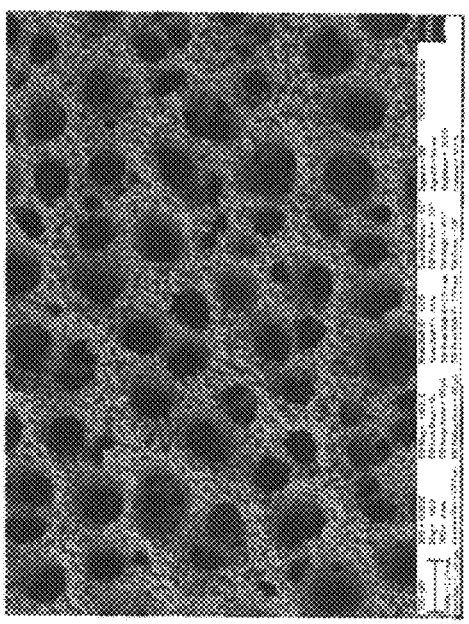
Figure 13D:
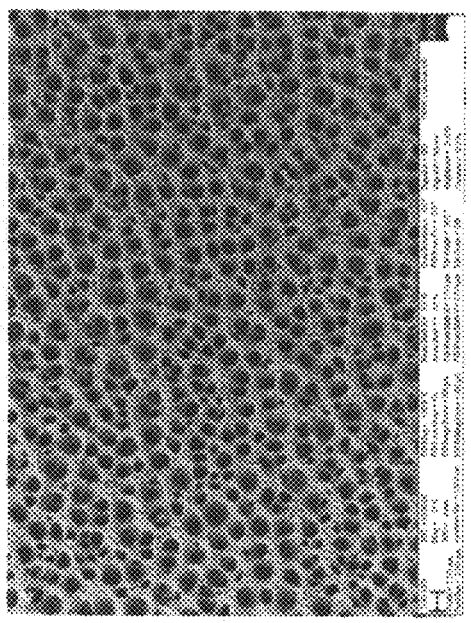

FIG. 10 is a process flow chart summarizing a method 1000 for forming lithium-ion battery 100 as illustrated in FIG. 1, according to one embodiment of the invention. In step 1001, an anode structure 102 is formed using method 600. In step 1002, an active cathodic material is deposited on the separator layer formed on the anode structure 102. As noted in step 902 of method 900, an active cathodic material may be deposited using PVD, thermal evaporation, or other methods known in the art. In step 1003, metal thin-film deposition process is used to form a cathodic current collector, thereby forming a complete Li-ion battery using only thin-film deposition techniques. CVD, PVD, thermal evaporation, electrochemical plating, and electroless plating processes may be used to form the cathodic current collector in step 1003. Materials that may be deposited to form the cathodic current collector include copper (Cu), cobalt (Co), nickel (Ni), aluminum (Al), zinc (Zn), magnesium (Mg), tungsten (W), their alloys, their oxides, and/or their lithium-containing compounds. Other materials that may form the cathodic current collector include tin (Sn), tin-cobalt (SnCo), tin-copper (Sn—Cu), tin-cobalt-titanium (Sn—Co—Ti), tin-copper-titanium (Sn—Cu—Ti), and their oxides. In step 1004, a dielectric layer is deposited on the cathodic current collector, thereby forming a complete battery cell. By using the complete battery cell so formed as a substrate, steps 1001-1004 may be performed again to form another complete battery cell thereon. In this way, a complete a battery having multiple cells may be formed in a series of thin-film deposition steps.

While the foregoing is directed to embodiments of the present invention, other and further embodiments of the invention may be devised without departing from the basic scope thereof, and the scope thereof is determined by the claims that follow.

The invention claimed is:

1. An anodic structure for use in an electrochemical device, comprising:
   a substrate having a surface that is conductive;
   a plurality of conductive microstructures formed on the surface of the substrate, wherein the plurality of conductive microstructures comprise columnar projections formed by an electroplating process;
   a mesoporous carbon layer formed over the conductive microstructures; and
   an insulative separator layer formed over the mesoporous carbon layer, wherein the plurality of conductive microstructures further comprise dendritic structures and a surface of the mesoporous carbon layer is substantially planar.

2. An anodic structure for use in an electrochemical device, comprising:
   a substrate having a surface that is conductive;
   a plurality of conductive microstructures formed on the surface of the substrate, wherein the plurality of conductive microstructures comprise columnar projections formed by an electroplating process;
   a mesoporous carbon layer formed over the conductive microstructures; and
   an insulative separator layer formed over the mesoporous carbon layer, wherein the plurality of conductive microstructures further comprise dendritic structures formed by an electroplating process or an electroless plating process.

3. The anodic structure of claim 1, wherein an average peak to valley variation across the substantially planar surface of the mesoporous carbon layer is characterized as being between about 5% and about 50% the thickness of the plurality of conductive microstructures deposited over the substrate.

4. The anodic structure of claim 1, wherein a macroscopic variation in the planarity of the substantially planar surface of the mesoporous carbon layer is characterized as being between about 90% and about 110% of the average thickness of the plurality of conductive microstructures deposited over the conductive surface of the substrate.

5. An anodic structure for use in an electrochemical device, comprising:
   a substrate having a surface that is conductive;
   a plurality of conductive microstructures formed on the surface of the substrate, wherein the plurality of conductive microstructures comprise columnar projections formed by an electroplating process;
   a mesoporous carbon layer formed over the conductive microstructures; and
   an insulative separator layer formed over the mesoporous carbon layer, wherein the mesoporous carbon layer comprises carbon fullerene onions interconnected with carbon nano-tubes.

6. An anodic structure for use in an electrochemical device, comprising:
   a substrate having a surface that is conductive;
   a plurality of conductive microstructures formed on the surface of the substrate, wherein the plurality of conductive microstructures comprise columnar projections formed by an electroplating process;
   a mesoporous carbon layer formed over the conductive microstructures; and
   an insulative separator layer formed over the mesoporous carbon layer, wherein the plurality of conductive microstructures form a layer that has a density that is between about 10% and about 50% of a solid film formed from the same material.

7. The anode structure of claim 6, wherein the layer is formed from a material selected from the group consisting of copper, tin, and combinations thereof.

8. An anodic structure for use in an electrochemical device, comprising:
   a substrate having a surface that is conductive;
   a plurality of conductive microstructures formed on the surface of the substrate, wherein the plurality of conductive microstructures comprise columnar projections formed by an electroplating process;
   a mesoporous carbon layer formed over the conductive microstructures; and
   an insulative separator layer formed over the mesoporous carbon layer, wherein the plurality of conductive microstructures further comprise a macro-porous structure that has a plurality of macroscopic pores between about 5 and about 100 microns in size.

9. The anode structure of claim 8, wherein the conductive microstructure further comprises a dendritic structure formed over the plurality of columnar projections, wherein the dendritic structure has a plurality of meso-pores that are between about 100 nanometers and about 1000 nanometers in size.

10. The anode structure of claim 9, wherein the dendritic structure has a plurality of nano-pores that are between about 20 nanometers and about 100 nanometers in size.

11. The anode structure of claim 8, wherein the mesoporous carbon layer comprises:
   a first carbon fullerene onion having a first diameter of between about 5 nm and about 50 nm;
   a first carbon nano-tube connected to the first carbon fullerene onion and having a first length of between about 5 nm and about 50 nm;
   a second carbon fullerene onion connected to the first carbon nano-tube and having a second diameter of between about 5 nm and about 50 nm;
   a second carbon nano-tube connected to the second carbon fullerene onion and having a second length of between about 5 nm and about 50 nm; and
   a third carbon fullerene onion connected to the second carbon nano-tube and having a third diameter of between about 5 nm and about 50 nm.

12. The anodic structure of claim 1, wherein the insulative separator layer comprises one of a polymer or a mesoporous carbon layer.

13. The anodic structure of claim 1, wherein the insulative separator layer comprises a polymerized carbon layer formed by further processing a portion of the mesoporous carbon layer.

14. The anodic structure of claim 13, wherein the insulative separator layer further comprises a dielectric layer.

15. The anodic structure of claim 1, wherein the mesoporous carbon layer comprises carbon fullerene onions interconnected with carbon nano-tubes.

16. The anodic structure of claim 2, wherein the insulative separator layer comprises one of a polymer or a mesoporous carbon layer.

17. The anodic structure of claim 2, wherein the insulative separator layer comprises a polymerized carbon layer formed by further processing a portion of the mesoporous carbon layer.

18. The anodic structure of claim 17, wherein the insulative separator layer further comprises a dielectric layer.

19. The anodic structure of claim 2, wherein the mesoporous carbon layer comprises carbon fullerene onions interconnected with carbon nano-tubes.

20. The anodic structure of claim 6, wherein the insulative separator layer comprises one of a polymer or a mesoporous carbon layer.

21. The anodic structure of claim 6, wherein the insulative separator layer comprises a polymerized carbon layer formed by further processing a portion of the mesoporous carbon layer.

22. The anodic structure of claim 21, wherein the insulative separator layer further comprises a dielectric layer.

23. The anodic structure of claim 8, wherein the insulative separator layer comprises one of a polymer or a mesoporous carbon layer.

24. The anodic structure of claim 8, wherein the insulative separator layer comprises a polymerized carbon layer formed by further processing a portion of the mesoporous carbon layer.

25. The anodic structure of claim 24, wherein the insulative separator layer further comprises a dielectric layer.

* * * * *